United States Patent
Gadda et al.

(10) Patent No.: US 10,190,490 B2
(45) Date of Patent: *Jan. 29, 2019

(54) ENERGY STORAGE AND CONVERSION IN FREE-PISTON COMBUSTION ENGINES

(71) Applicant: EtaGen, Inc., Menlo Park, CA (US)

(72) Inventors: Christopher Gadda, Palo Alto, CA (US); Matthew Roelle, Belmont, CA (US); Adam Simpson, San Francisco, CA (US)

(73) Assignee: EtaGen, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,995

(22) Filed: Jul. 10, 2017

(65) Prior Publication Data

US 2017/0306837 A1    Oct. 26, 2017

Related U.S. Application Data

(63) Continuation of application No. 14/598,173, filed on Jan. 15, 2015, now Pat. No. 9,719,415.

(51) Int. Cl.
| | |
|---|---|
| *F02B 71/04* | (2006.01) |
| *F02B 63/04* | (2006.01) |
| *H02K 7/18* | (2006.01) |
| *F02B 71/00* | (2006.01) |

(52) U.S. Cl.
CPC ............ *F02B 71/04* (2013.01); *F02B 63/041* (2013.01); *F02B 71/00* (2013.01); *H02K 7/1884* (2013.01)

(58) Field of Classification Search
CPC ....... F02B 71/04; F02B 75/285; F02B 63/041
USPC ....................................... 123/46 E
See application file for complete search history.

(56) References Cited

U.S. PATENT DOCUMENTS

| | | |
|---|---|---|
| 3,370,576 A | 2/1968 | Huber |
| 6,199,519 B1 | 3/2001 | Van Blarigan |
| 7,258,085 B2 | 8/2007 | Niiyama et al. |
| 8,413,617 B2 | 4/2013 | Simpson et al. |

(Continued)

FOREIGN PATENT DOCUMENTS

| | | |
|---|---|---|
| DE | 102008053069 A1 | 5/2010 |
| GB | 2476495 A | 6/2011 |
| WO | WO 2009/045521 | 4/2009 |

OTHER PUBLICATIONS

Goto S., Moriya, K., Kosaka, H., Akita, T. et al., "Development of Free Piston Engine Linear Generator System Part 2—Investigation of Control System for Generator," SAE Technical Paper, Apr. 1, 2014, pp. 1-8, SAE International.

(Continued)

*Primary Examiner* — Stephen K Cronin
*Assistant Examiner* — Anthony L Bacon
(74) *Attorney, Agent, or Firm* — Haley Guiliano LLP

(57) ABSTRACT

Various embodiments of the present disclosure are directed towards free-piston combustion engines. As described herein, a driver section may be provided in a free-piston combustion engine for storing energy during an expansion stroke. The driver section may be configured to store sufficient energy to perform the subsequent stroke. In some embodiments, the driver section may be configured to store sufficient energy so as to enable the engine to operate continuously across engine cycles without electrical energy input. A linear electromagnetic machine may be provided in a free-piston combustion engine for converting the kinetic energy of a piston assembly into electrical energy.

24 Claims, 14 Drawing Sheets

(56) References Cited

U.S. PATENT DOCUMENTS

| | | |
|---|---|---|
| 8,662,029 B2 | 3/2014 | Simpson et al. |
| 2008/0036312 A1 | 2/2008 | Max et al. |
| 2008/0308335 A1 | 12/2008 | Anderson et al. |
| 2012/0112468 A1 | 5/2012 | Najt et al. |
| 2012/0125288 A1 | 5/2012 | Simpson et al. |
| 2012/0125291 A1 | 5/2012 | Simpson et al. |
| 2012/0126543 A1 | 5/2012 | Simpson et al. |
| 2013/0119675 A1 | 5/2013 | Petkanchin |
| 2014/0216411 A1 | 8/2014 | Holmes |

OTHER PUBLICATIONS

Ashley, Steven, "Free-Piston IC Generator Developed for Range-Extender Hybrids," Automotive Engineering Magazine, Jul. 3, 2013, pp. 1-2, SAE International.

International Search Report and Written Opinion of the International Searching Authority for application No. PCT/US2016/013083, dated Apr. 20, 2016.

Two opposed pistons, single combustion chamber

Single piston, dual combustion chambers

Single piston, single combustion chambers

ENERGY STORAGE AND CONVERSION IN FREE-PISTON COMBUSTION ENGINES

This application is a continuation of U.S. patent application Ser. No. 14/598,173 filed Jan. 15, 2015, the contents of which is incorporated herein by reference in its entirety.

The present disclosure relates to free-piston combustion engines and, more particularly, the present disclosure relates to energy storage and conversion in free-piston combustion engines.

SUMMARY

In some embodiments, a free-piston combustion engine system is provided, comprising: a cylinder comprising a combustion section; at least one free-piston assembly in contact with the combustion section; at least one driver section in contact with the at least one free-piston assembly; at least one linear electromagnetic machine for directly converting between kinetic energy of the at least one free-piston assembly and electrical energy; and processing circuitry that for the purpose of avoiding net electrical energy input over a subsequent stroke of the piston cycle, causes the at least one driver section to store at least a sufficient amount of energy from the at least one free-piston assembly during the expansion stroke to perform the subsequent stroke of the piston cycle.

In some embodiments, a free-piston combustion engine system is provided, comprising: a cylinder comprising a combustion section; at least one free-piston assembly in contact with the combustion section; at least one driver section in contact with the at least one free-piston assembly, wherein the at least one driver section is configured to store energy from the at least one free-piston assembly during an expansion stroke of a piston cycle; at least one linear electromagnetic machine for directly converting between kinetic energy of the at least one free-piston assembly and electrical energy; and processing circuitry that necessarily causes the at least one driver section to store at least a sufficient amount of energy from the at least one free-piston assembly during the expansion stroke to perform a subsequent stroke of the piston cycle without net electrical energy input over the subsequent stroke of the piston cycle.

In some embodiments, a system for controlling a free-piston combustion engine comprising at least one free-piston assembly in contact with a respective at least one driver section, and at least one linear electromagnetic machine for directly converting kinetic energy of the at least one free-piston assembly into electrical energy, the system comprising: at least one sensor coupled to the free-piston combustion engine for measuring a respective at least one operating characteristic of the engine and for outputting a respective at least one sensor signal; at least one control mechanism for adjusting a respective at least one operating characteristic of the free-piston combustion engine based on a respective at least one control signal; and processing circuitry that takes as input the at least one sensor signal and that outputs the at least one control signal, the processing circuitry configured to: process the at least one sensor signal to cause, using the control mechanism, the at least one driver section to store at least a sufficient amount of energy from the at least one free-piston assembly during the expansion stroke to perform a subsequent stroke of the piston cycle without net electrical energy input over the subsequent stroke of the piston cycle.

In some embodiments, a method of controlling a free-piston combustion engine comprising at least one free-piston assembly in contact with a respective at least one driver section, and at least one linear electromagnetic machine for directly converting kinetic energy of the at least one free-piston assembly into electrical energy, is provided, the method comprising: receiving at least one operating characteristic of the free-piston combustion engine; processing the at least one operating characteristic, using processing circuitry, to cause the driver section to store at least a sufficient amount of energy from the at least one free-piston assembly during an expansion stroke of a piston cycle to perform a subsequent stroke of the piston cycle; and causing, using the processing circuitry, the subsequent stroke of the piston cycle to be performed without net electrical energy input to the engine.

Other features and aspects will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The figures are not intended to be exhaustive or to limit the disclosure to the precise form disclosed. It should be understood that the concepts and embodiments disclosed can be practiced with modification and alteration, and that the disclosure is limited only by the claims and the equivalents thereof.

DETAILED DESCRIPTION

Various embodiments of the present disclosure are directed towards a free-piston, linear combustion engine characterized by high thermal efficiencies. In at least one embodiment, the engine comprises: (i) a cylinder comprising a combustion section, (ii) at least one free-piston assembly in contact with the combustion section, (iii) at least one driver section in contact with the at least one free-piston assembly that stores energy during an expansion stroke of the engine (iv) and at least one linear electromagnetic machine (LEM) that directly converts between kinetic energy of the at least one free-piston assembly and electrical energy. It should be noted, however, that further embodiments may include various combinations of the above-identified features and physical characteristics.

Figure 1:
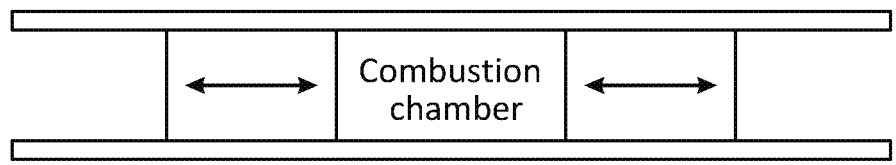
FIG. 1 is a diagram of three illustrative free-piston combustion engine configurations.
Figure 1:
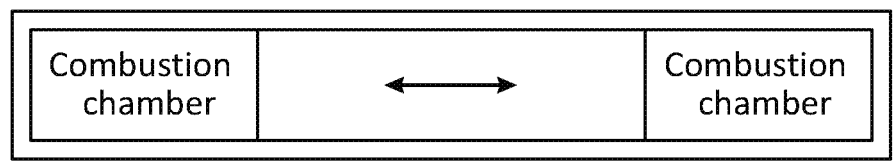
Figure 1:
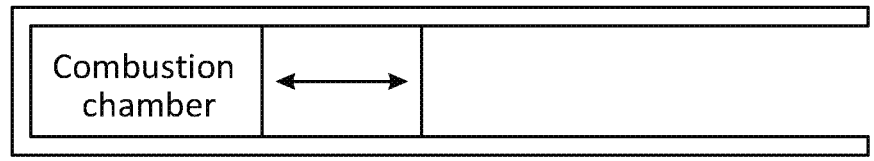

Generally, free-piston combustion engine configurations can be broken down into three categories: 1) two opposed pistons, single combustion chamber, 2) single piston, dual combustion chambers, and 3) single piston, single combustion chamber. A diagram of the three common free-piston combustion engine configurations is shown in FIG. 1. Several illustrative embodiments of linear free-piston combustion engines are illustrated in U.S. Pat. No. 8,662,029, issued on Mar. 4, 2014, and entitled "High-efficiency linear combustion engine," which is hereby incorporated by reference herein in its entirety. It will be understood that while the present disclosure is presented in the context of certain specific illustrative embodiments of linear free-piston combustion engines, the concepts discussed herein are applicable to any other suitable free-piston combustion engines, including, for example, non-linear free piston engines. Free-piston engines generally include one or more free-piston assemblies that are free from mechanical linkages that translate the linear motion of the piston assembly into rotary motion (e.g., a slider-crank mechanism) or free from mechanical linkages that directly control piston dynamics (e.g., a locking mechanism). Free-piston engines have a number of benefits over such mechanically-linked piston engines, which lead to increased efficiency. For example, due to the inherent architectural limitations of mechanically-linked piston engines, free-piston engines can be configured with higher compression ratios and expansion ratios, which lead to higher engine efficiencies as, described in the previously referenced and incorporated U.S. Pat. No. 8,662,029. Moreover, free-piston engines allow for increased variability in the compression and expansion ratios, including allowing for the compression ratio to be greater than the expansion ratio and allowing for the expansion ratio to be greater than the compression ratio, which may also increase the engine efficiency. The free-piston engine architecture also allows for increased control of the compression ratio on an engine cycle-to-cycle basis, which allows for adjustments due to variable fuel quality and fuel type. Additionally, due to the lack of mechanical linkages, free-piston engines result in substantially lower side loads on the piston assemblies, which allows for oil-less operation, and in turn, reduced friction and losses resulting therefrom.

Figure 2:
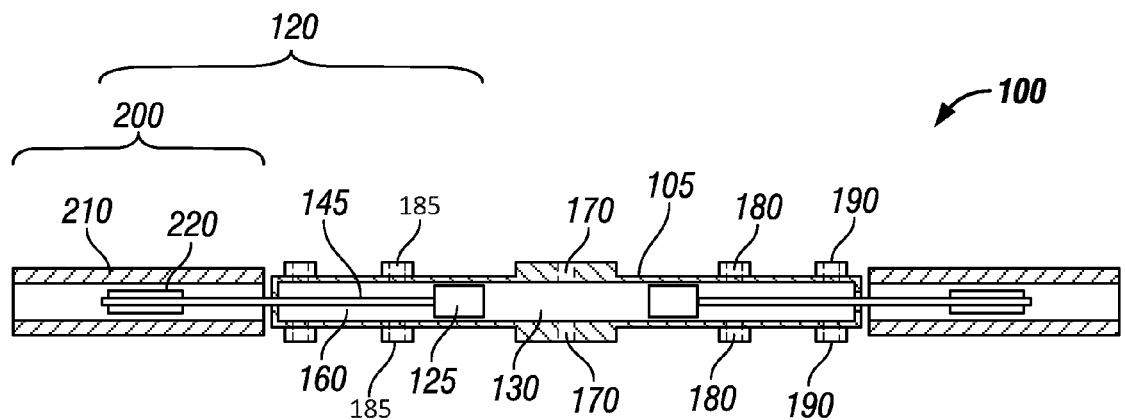
FIG. 2 is a cross-sectional drawing illustrating a two-piston, single-combustion section, integrated gas springs, and separated linear electromagnetic machine engine, in accordance with some embodiments of the present disclosure.

FIG. 2 is a cross-sectional drawing illustrating one embodiment of a two-piston, single-combustion section, integrated gas springs, and separated LEM free-piston internal combustion engine 100. This free-piston, internal combustion engine 100 directly converts the chemical energy in a fuel into electrical energy via an LEM 200. As used herein, the term "fuel" refers to matter that reacts with an oxidizer. Such fuels include, but are not limited to: (i) hydrocarbon fuels such as natural gas, biogas, gasoline, diesel, and biodiesel; (ii) alcohol fuels such as ethanol, methanol, and butanol; (iii) hydrogen; and (iv) mixtures of any of the above. The engines described herein are suitable for both stationary power generation and mobile power generation (e.g., for use in vehicles).

Engine 100 includes a cylinder 105 with two opposed piston assemblies 120 dimensioned to move within the cylinder 105 and meet at a combustion section 130 in the center of the cylinder 105. Each piston assembly 120 may include a piston 125 and a piston rod 145. The piston assemblies 120 are free to move linearly within the cylinder 105.

With further reference to FIG. 2, the volume between the backside of the piston 125, piston rod 145, and the cylinder 105 is referred to herein as the driver section 160. As used herein, a "driver section" refers to a section of an engine cylinder capable of storing energy and providing energy to displace the piston assembly without the use of combustion. The driver section 160, in some embodiments, may contain a non-combustible fluid (i.e., gas, liquid, or both). In the illustrated embodiment, the fluid in the driver section 160 is a gas that acts as a gas spring. Driver section 160 stores energy from an expansion stroke of the piston cycle and provides energy for a subsequent stroke of the piston cycle, i.e. the stroke that occurs after an expansion stroke. For example, kinetic energy of the piston may be converted into potential energy of the gas in the driver section during an expansion stroke of the engine. As used herein, the term "piston cycle" refers to any series of piston movements that begin and end with the piston 125 in substantially the same configuration. One common example is a four-stroke piston cycle, which includes an intake stroke, a compression stroke, a power stroke, and an exhaust stroke. Additional alternate strokes may form part of a piston cycle as described throughout this disclosure. A two-stroke piston cycle is characterized as having a power stroke and a compression stroke. As used herein, an "expansion stroke" refers to a stroke of a piston cycle during which the piston assembly moves from a top-dead-center ("TDC") position to a bottom-dead-center ("BDC") position, where TDC refers to the position of the piston assembly, or assemblies, when the combustion section volume is at a minimum and BDC refers to the position of the piston assembly, or assemblies, when the combustion section volume is at a maximum. As noted above, since the compression ratio and expansion ratio of a free-piston engine can vary or be varied from cycle-to-cycle, the TDC and BDC positions can also vary or be varied from cycle-to-cycle, in some embodiments. Accordingly, as will be described below in further detail, an expansion stroke may refer to an intake stroke, a power stroke, or both. In some embodiments, the amount of energy to be stored by the driver section during an expansion stroke may be determined based on various criteria and controlled by a controller and associated processing circuitry as will be described below in further detail. For example, in some embodiments, the amount of energy to be stored by a driver section during an expansion stroke may be determined based on the energy required in a subsequent stroke, i.e., the stroke that occurs after the expansion stroke. In some embodiments, the controller and associated processing circuitry may, for the purpose of avoiding net electrical energy input over a subsequent stroke of the piston cycle, cause the driver section to store at least a sufficient amount of energy from the free-piston assembly during the expansion stroke to perform the subsequent stroke. In some embodiments, the controller and associated processing circuitry may necessarily cause the driver section to store at least a sufficient amount of energy from the free-piston assembly during an expansion stroke to perform the subsequent stroke without net electrical energy input over the subsequent stroke. In some embodiments, the amount of energy stored by the driver section during an expansion stroke may be greater than the amount required for a subsequent stroke. For example, in the case of a two-stroke piston cycle, the driver section may store, during a power stroke, an amount of energy greater than the amount of energy required for the subsequent compression stroke. In some embodiments, for example, in the case of a four-stroke piston cycle, the driver section may store an amount of energy, during a power stroke, greater than the amount of energy required for the subsequent exhaust stroke. In some embodiments, for example, in the case of a four-stroke piston cycle, the driver section may store an amount of energy, during an intake stroke, greater than the amount of energy required for the subsequent compression stroke. In some embodiments, the amount of energy stored in excess of that required for the subsequent stroke may be converted into electrical energy by LEMs 200 as will be described in more detail below. In some embodiments, the amount of energy stored by the driver section during an expansion stroke may be determined so as to enable the engine to operate continuously across consecutive piston cycles without electrical energy input from the LEMs 200. For example, the amount of energy stored by the driver section during an expansion stroke may be determined so as to enable the engine to operate continuously across piston cycles without external electrical energy input other than that which may be required for initial start-up of the engine.

For purposes of brevity and clarity, the driver section will primarily be described herein in the context of a gas spring and may be referred to herein as the "gas section," "gas springs" or "gas springs section." It will be appreciated that in some arrangements, the driver section 160 may include one or more other mechanisms in addition to or in place of a gas spring. For example, such mechanisms can include one or more mechanical springs, magnetic springs, or any suitable combination thereof. In some arrangements, a highly efficient linear alternator may be included that operates as a motor, which may be used in place of or in addition to a spring (pneumatic, hydrodynamic, or mechanical) for generating compression work. It will be understood by those skilled in the art that in some embodiments, the geometry of the driver section may be selected to minimize losses and maximize the efficiency of the driver section. For example, the diameter and/or dead volume of the driver section may be selected to minimize losses and maximize the efficiency of the driver section. As used herein, the term "dead volume" refers to the volume of the driver section when the piston assembly is at a BDC position. In some embodiments, for example, if the driver section is a gas or hydraulic spring, the diameter of the section may be different than the combustion section in order to provide for increased efficiency. Certain embodiments of gas springs will be described below in further detail with reference to FIGS. 8-12.

Combustion ignition can be achieved via, for example, compression ignition and/or spark ignition. Fuel can be directly injected into the combustion chamber 130 via fuel injectors ("direct injection") and/or mixed with air prior to and/or during air intake ("premixed injection"). The engine 100 can operate with lean, stoichiometric, or rich combustion using liquid fuels, gaseous fuels, or both, including hydrocarbons, hydrogen, alcohols, or any other suitable fuels as described above.

Cylinder 105 may include injector ports 170, intake ports 180, exhaust ports 185, and driver gas exchange ports 190, for exchanging matter (solid, liquid, gas, or plasma) with the surroundings. As used herein, the term "port" includes any opening or set of openings (e.g., a porous material) which allows matter exchange between the inside of the cylinder 105 and its surroundings. It will be understood that the ports shown in FIG. 2 are merely illustrative. In some arrangements, fewer or more ports may be used. The above-described ports may or may not be opened and closed via valves. The term "valve" may refer to any actuated flow controller or other actuated mechanism for selectively passing matter through an opening. Valves may be actuated by any means, including but not limited to: mechanical, electrical, magnetic, camshaft-driven, hydraulic, or pneumatic means. The number, location, and types of ports and valves may depend on the engine configuration, injection strategy, and piston cycle (e.g., two- or four-stroke piston cycles). In some embodiments, the matter exchange of the ports may be achieved by the movement of the piston assembly, which may cover and/or uncover the ports as necessary to allow exchange of matter.

In some embodiments, the operation of driver section 160 may be adjustable. In some embodiments, driver gas exchange ports 190 may be utilized to control characteristics of the driver section. For example, driver gas exchange ports 190 may be used to control the amount, temperature, pressure, any other suitable characteristics, and/or any combination thereof of the gas in the driver section. In some embodiments, adjusting any of the aforementioned characteristics and thus adjusting the amount of mass in the cylinder may vary the effective spring constant of the gas spring. In some embodiments, the geometry of driver section 160 may be adjusted to obtain desirable operation. For example, the volume of the driver section 160 may be increased or decreased by controlling the driver gas exchange ports 190 and the characteristics of the driver gas flowing therein. In some embodiments, the dead volume within the cylinder may be adjusted to vary the spring constant of the gas spring. It will be understood that any of the aforementioned control and adjustment of the driver section 160 and the gas therein may provide for control of the amount of energy stored by driver section 160 during an expansion stroke of engine 100. It will also be understood that the aforementioned control of the characteristics of the gas in driver section 160 also provides for variability in the frequency of engine 100.

Engine 100 may include a pair of LEMs 200 for directly converting the kinetic energy of the piston assemblies 120 into electrical energy (e.g., during a compression stroke, during an expansion stroke, during an exhaust stroke, and/or during an intake stroke). Each LEM 200 is also capable of directly converting electrical energy into kinetic energy of the piston assembly 120. In some embodiments, the LEMs 200 may convert electrical energy into kinetic energy of the piston in order to start-up the engine, but need not convert electrical energy into kinetic energy during operation once the engine has started and sufficient fuel chemical energy is being converted into kinetic energy of the piston, at least part of which may be stored in the driver section 160 during expansion strokes. In some embodiments, start-up of the engine may be achieved by any other suitable technique, including, for example, the use of stored compressed gas. As illustrated, the LEM 200 includes a stator 210 and a translator 220. Specifically, the translator 220 is coupled to the piston rod 145 and moves linearly within the stator 210, which may remain stationary. In addition, the LEM 200 can be a permanent magnet machine, an induction machine, a switched reluctance machine, or any combination thereof. The stator 210 and translator 220 can each include magnets, coils, iron, or any suitable combination thereof. Because the LEM 200 directly transforms the kinetic energy of the pistons to and from electrical energy (i.e., there are no mechanical linkages), the mechanical and frictional losses are minimal compared to conventional engine-generator configurations. Furthermore, because the LEM 200 is configured to convert portions of the kinetic energy of the piston assemblies into electrical energy during any stroke of a piston cycle, and engine 100 includes an adjustable driver section 160 configured to store energy from an expansion stroke that can be converted to electrical energy during a subsequent stroke, the LEM 200 may be configured to have a lower electrical capacity than, for example, an LEM or other device that requires conversion of all energy within a single stroke of a piston cycle (e.g., only within the expansion stroke). Accordingly, in some embodiments, the associated linear alternator and power electronics of the LEM 200 may be reduced in size, weight, and/or electrical capacity. This may result in decreased size and cost of components, increased efficiency, increased reliability, and increased utilization as will be understood by one of ordinary skill in the art. Accordingly, the frequency and therefore power output of the engine may be increased in some embodiments.

It will be understood by one of ordinary skill in the art that each LEM 200 may be operated as both a generator and a motor. For example, when LEMs 200 convert kinetic energy of piston assemblies 120 into electrical energy they operate as generators. When acting as generators, the forces applied to translators 220 are in the opposite direction of the motion of piston assemblies 120. Conversely, when LEMs 200 convert electric energy into kinetic energy of piston assemblies 120 they operate as motors. When acting as motors, the forces applied to translators 220 are in the same direction as the motion of piston assemblies 120. For ease of reference, the center line in FIG. 2 (near injector ports 170) and corresponding figures may be considered the origin, with the positive direction for each piston assembly being away from the center, in the outward direction.

Figure 3:
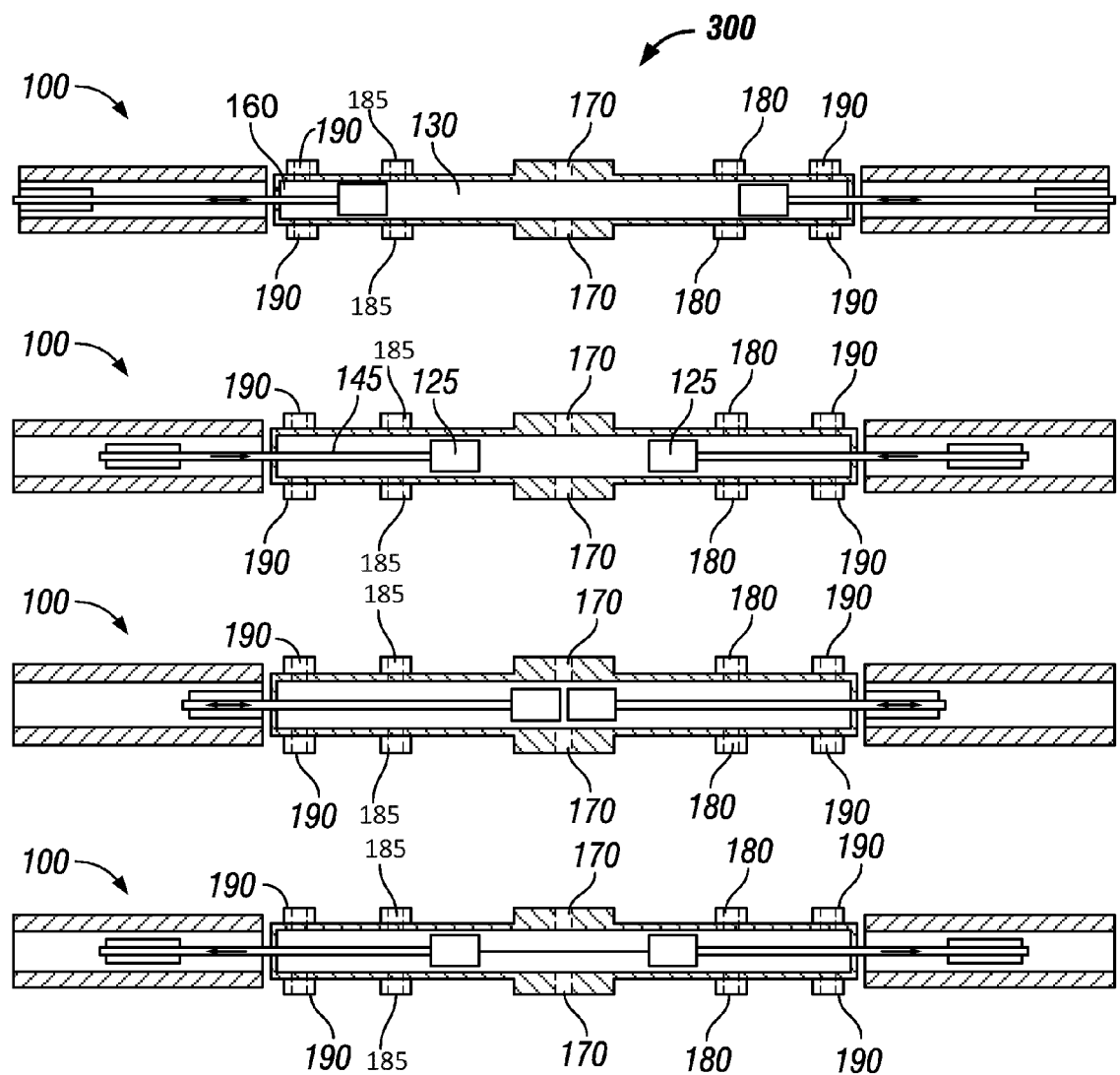
FIG. 3 is a diagram illustrating the two-stroke piston cycle of the two-piston integrated gas springs engine of FIG. 2, in accordance with some embodiments of the present disclosure.

The embodiment shown in FIG. 2 operates using a two-stroke piston cycle. A diagram illustrating the two-stroke piston cycle 300 of the two-piston integrated gas springs engine 100 of FIG. 2 is illustrated in FIG. 3. As illustrated in FIG. 3, engine 100 may operate using a two-stroke piston cycle including a compression stroke and a power stroke, with the pistons located at BDC prior to the compression stroke, and at top-dead-center TDC prior to the power stroke. As used herein with reference to the two-piston embodiment, BDC may refer to the point at which the pistons are furthest from each other. As used herein with reference to the two-piston embodiment, TDC may refer to the point at which the pistons are closest to each other. When at or near BDC, and if the driver section is to be used to provide compression work, the pressure of the gas within the driver section 160 is greater than the pressure of the combustion section 130, which forces the pistons 125 away from BDC and inwards towards each other, i.e., in the negative direction. The gas in the driver section 160 can be used to provide some or all of the energy required to perform a compression stroke. As described above, in some embodiments, the piston 125 may be forced away from BDC by any other suitable mechanism, including a mechanical spring, a magnetic spring, or any other suitable mechanism that may be used to provide compression work. While the LEM 200 may also provide some of the energy required to perform a compression stroke, in a preferred embodiment, when sufficient energy is being produced during combustion, enough energy may be stored in the driver section 160 such that LEM 200 need not convert any electrical energy into kinetic energy of the piston 125 because the energy stored in driver section 160 may be transferred to the piston to provide the requisite compression work. The LEM 200 may also extract energy during the compression stroke. For example, if the gas in the driver section 160 (or other suitable means as described above) provides excess energy for performing the compression stroke, the LEM 200 may convert a portion of the kinetic energy of the piston assembly 120 into electrical energy.

The amount of energy required to perform a compression stroke may depend on the desired compression ratio, the pressure and temperature of the combustion section 130 at the beginning of the compression stroke, and the mass of the piston assembly 120. As described above, driver section 160 may provide all of the energy needed for the compression stroke so that no other energy input (from LEM 200 or any other source) is necessary. In some embodiments, some energy may be input during the compression stroke, but the net energy during the compression stroke is still positive. A compression stroke continues until combustion occurs, which typically occurs at a time when the velocities of the pistons 125 are at or near zero. Combustion causes an increase in the temperature and pressure within the combustion section 130, which forces the pistons 125 outward toward the LEMs 200. During a power stroke, a portion of the kinetic energy of the piston assembly 120 may be converted into electrical energy by the LEM 200 and another portion of the kinetic energy does compression work on the gas (or other compression mechanism) in the driver section 160. Alternatively, all of the kinetic energy of the piston assembly may be stored in driver section 160. A power stroke continues until the velocities of the pistons 125 are zero. After the power stroke and before the subsequent compression stroke, with pistons 125 at or near BDC, the engine may exhaust combustion products and intake air, an air/fuel mixture, or an air/fuel/combustion products mixture. This process may be referred to herein as "breathing" or "breathing at or near BDC." It will be appreciated by those of ordinary skill in the art that breathing may be achieved in any suitable manner, such as uni-flow or cross-flow scavenging, as described in previously referenced and incorporated U.S. Pat. No. 8,662,029. It will also be appreciated that although described as occurring after the power stroke, in some embodiments breathing may occur during the end of the power stroke and/or the beginning of the compression stroke. Similarly, in some embodiments, combustion may occur during the end of the compression stroke and/or the beginning of the power stroke.

FIG. 3 illustrates one exemplary port configuration 300 in which the intake ports 180 and exhaust ports 185 are in front of both pistons near BDC. The opening and closing of the exhaust ports 185 and intake ports 180 may be independently controlled. The location of the exhaust ports 185 and intake ports 180 can be chosen such that a range of compression ratios and/or expansion ratios is possible. The times in a cycle when the exhaust ports 185 and intake ports 180 are activated (opened and closed) can be adjusted during and/or between cycles to vary the compression ratio and/or expansion ratio and/or the amount of combustion product retained in the combustion section 130 at the beginning of a compression stroke. Retaining combustion gases in the combustion section 130 is called residual gas trapping (RGT) and can be utilized to effect combustion timing, peak combustion temperatures, and other combustion and engine performance characteristics.

Although operation of a two-stroke cycle is described above, the embodiment of FIG. 2 may also be operated using a four-stroke piston cycle, which includes an intake stroke, a compression stroke, a power (expansion) stroke, and an exhaust stroke. In some embodiments, any suitable modification may be made to operate using a four-stroke piston cycle. For example, as described in the previously referenced and incorporated U.S. Pat. No. 8,662,029, the location of the ports may be modified to operate the engine using a four-stroke piston cycle.

In some embodiments, in a four-stroke piston cycle, just as in the two-stroke cycle described above, driver section 160 may provide all of the work necessary for the compression stroke. In some embodiments, the driver section 160 may provide enough work to avoid net electrical energy input during the compression stroke. The compression stroke may continue until combustion occurs, e.g., when the velocities of pistons 125 are at or near zero. Combustion may be followed by a power stroke, during which kinetic energy of the piston assemblies 120 may be stored in driver section 160 and/or converted into electrical energy by LEMs 200 as described above with respect to the two-stroke cycle. At some point at or near the power-stroke BDC, exhaust ports may be opened, and an exhaust stroke may occur until the velocities of pistons 125 are at or near zero, which marks the exhaust stroke TDC for that cycle. As described above, the energy stored in driver section 160 during the power stroke may provide the work required to perform the exhaust stroke. At some point prior to reaching exhaust stroke TDC, the combustion section 130 closes the exhaust valves while there is still exhaust in the cylinder. In some embodiments, this trapped exhaust gas may store enough energy to perform the subsequent intake stroke. As with the power stroke, the kinetic energy of the piston assemblies 120 may be stored in driver section 160 and/or converted into electrical energy by LEMs 200 during the intake stroke, which occurs until the velocities of the pistons 125 are at zero. In some embodiments, driver section 160 may store enough energy during the intake stroke to perform the subsequent compression stroke. In some embodiments, any suitable amount of energy stored in the driver section in excess of the amount required for a subsequent compression stroke or a subsequent exhaust stroke may be converted into electrical energy by LEMs 200.

Figure 4:
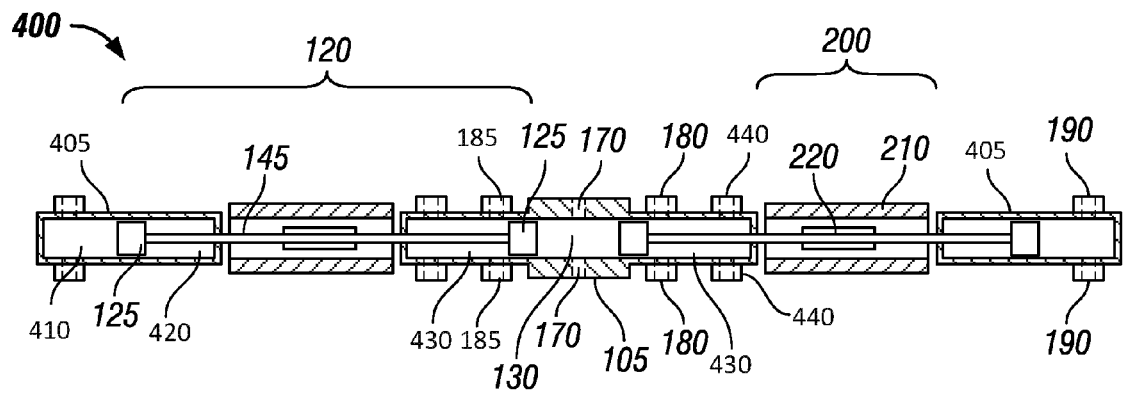
FIG. 4 is a cross-sectional drawing illustrating an alternative two-piston, separated gas springs, and separated linear electromagnetic machine engine, in accordance with some embodiments of the present disclosure.

FIG. 4 is a cross-sectional drawing illustrating an alternative two-piston, separated gas springs, and separated LEM engine, in accordance with the principles of the disclosure. It will be understood that the illustrated configuration is merely for purposes of example, and that any other suitable configuration of a two-piston, separated gas springs, and separated LEM engine may be used in accordance with the present disclosure. Engine 400 includes a main cylinder 105, two opposed piston assemblies 120, and a combustion section 130 located in the center of main cylinder 105. The illustrated engine 400 has certain physical differences when compared with engine 100. Specifically, engine 400 includes a pair of outer cylinders 405 that contain additional pistons 125, and the LEMs 200 are disposed between the main cylinder 105 and the outer cylinders 405. Each outer cylinder 405 includes a driver section 410 located between the piston 125 and the distal end of the outer cylinder 405 and a driver back section 420 located between the piston 125 and the proximal end of the outer cylinder 405. Main cylinder 105 includes a pair of combustion back sections 430 disposed between the pistons 125 and the distal ends of the main cylinder 105. In some embodiments, the driver back section 420 and the combustion back section 430 are maintained at or near atmospheric pressure. In some embodiments, the driver back section 420 and the combustion back section 430 are not maintained at or near atmospheric pressure. In the illustrated configuration, the main cylinder 105 has ports 440 for removal of blow-by gas, injector ports 170, intake ports 180, and exhaust ports 185. Driver gas exchange ports 190 are located in the outer cylinders 405. Each piston assembly 120 includes two pistons 125 and a piston rod 145. The piston assemblies are free to move linearly between the main cylinder 105 and the outer cylinders 405 as depicted in FIG. 4. It will be understood that the embodiment of FIG. 4 can operate using a two-stroke piston cycle using, for example, the methodology as set forth above with respect to FIG. 3, and a four-stroke piston cycle as described above and in previously referenced and incorporated U.S. Pat. No. 8,662,029.

The configuration of FIGS. 2 and 3, as shown, includes a single unit referred to as the engine 100 and defined by the cylinder 105, the piston assemblies 120 and the LEMs 200. Similarly, the configuration of FIG. 4, as shown, includes a single unit referred to as the engine 400 and defined by the main cylinder 105, the piston assemblies 120, the outer cylinders 405, and the LEMs 200. However, multiple units can be placed in parallel, which could collectively be referred to as "the engine." This type of modular arrangement in which engine units operate in parallel may be used to enable the scale of the engine to be increased as needed by the end user. Additionally, not all units need be the same size, operate under the same conditions (e.g., frequency, stoichiometry, or breathing), or operate simultaneously (e.g., one or several units could be deactivated while one or several other units operate). When the units are operated in parallel, there exists the potential for integration between the engines, such as, but not limited to, gas exchange between the units and/or feedback between the units' respective LEMs 200.

Figure 5:
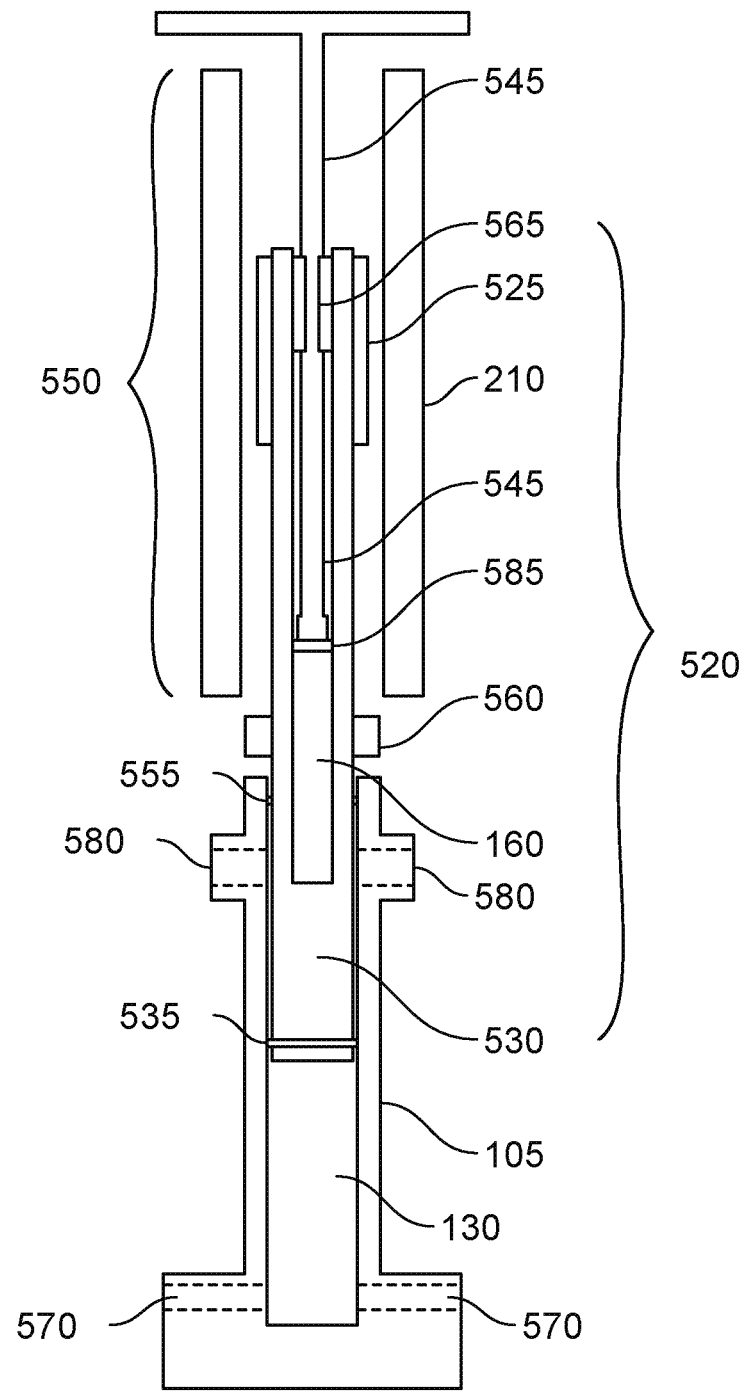
FIG. 5 is a cross-sectional drawing illustrating a single-piston, integrated internal gas spring engine, in accordance with some embodiments of the present disclosure.
Figure 6:
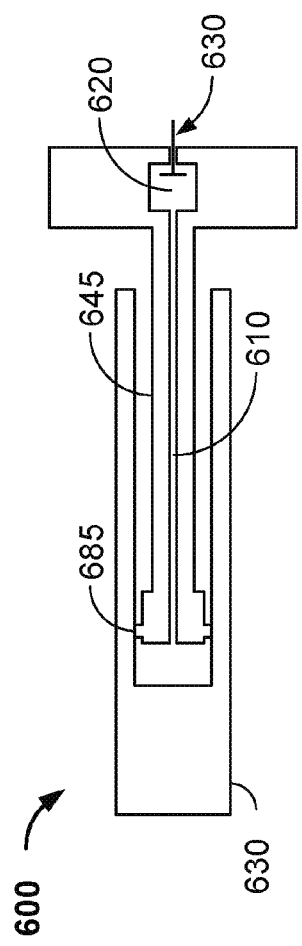
FIG. 6 is a cross-sectional drawing illustrating an embodiment of a gas spring rod, in accordance with some embodiments of the present disclosure.
Figure 7:
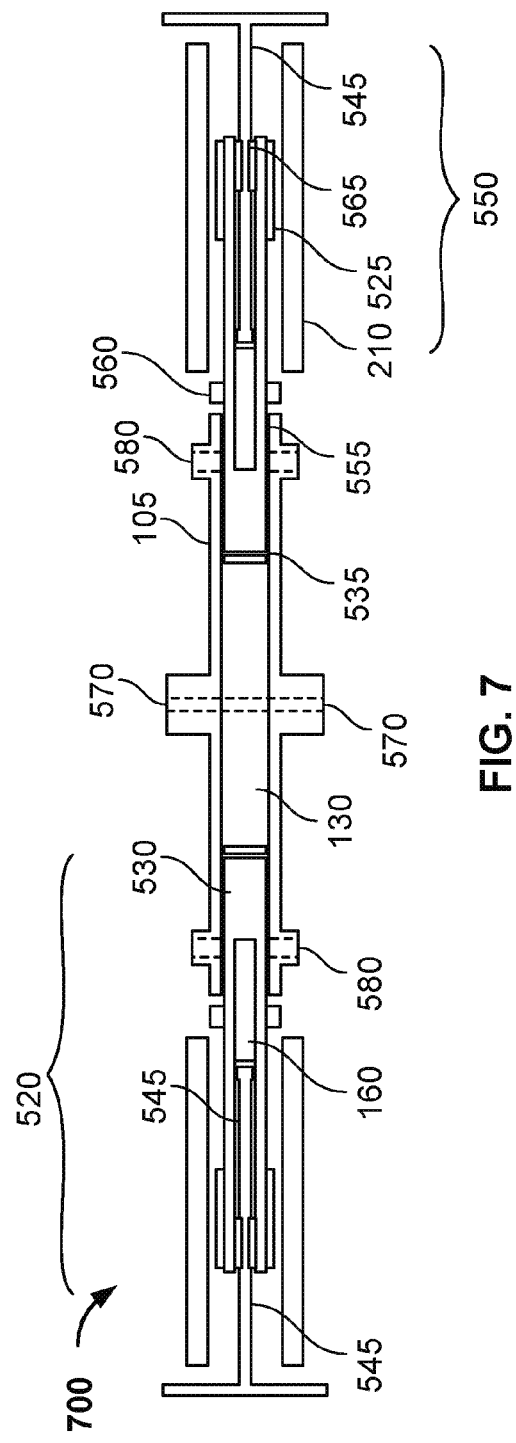
FIG. 7 is a cross-sectional drawing illustrating a two-piston, integrated internal gas springs engine, in accordance with some embodiments of the present disclosure.

FIGS. 5-7 illustrate further embodiments featuring integrated internal gas springs in which the gas spring is integrated inside of the piston assembly and the LEM is separated from the combustor cylinder. As illustrated in FIGS. 5-7, the integrated internal gas spring (IIGS) architecture may be similar in length to the integrated gas spring with separated LEM architecture illustrated in FIGS. 2-3. However, the IIGS architecture may eliminate issues with respect to the blow-by gases from the combustion section entering the gas spring, which also occurs in the fully integrated gas spring and LEM architecture.

FIG. 5 is a cross-sectional drawing illustrating a single-piston, integrated internal gas spring engine, in accordance with some embodiments of the present disclosure. Many components such as the combustion section 130 are similar to the components in previous embodiments (e.g., FIGS. 1 and 2), and are labeled accordingly. The engine 500 comprises a cylinder 105 with piston assembly 520 dimensioned to move within the cylinder 105 in response to reactions within combustion section 130 near the bottom end of the cylinder 105. Piston assembly 520 comprises a piston 530, piston seals 535, and a spring rod 545. The piston assembly 520 is free to move linearly within the cylinder 105. In the illustrated embodiment, the piston rod 545 moves along bearings 560 and is sealed by piston rod seals 555 that are fixed to the cylinder 105. The cylinder 105 includes exhaust/injector ports 570, 580 for intake of air, fuel, exhaust gases, air/fuel mixtures, and/or air/exhaust gases/fuel mixtures, exhaust of combustion products, and/or injectors. Some embodiments do not require all of the ports depicted in FIG. 5. The number and types of ports depends on the engine configuration, injection strategy, and piston cycle (e.g., two- or four-stroke piston cycles).

In the illustrated embodiment, the engine 500 further comprises an LEM 550 (including stator 210 and magnets 525) for directly converting the kinetic energy of the piston assembly 520 into electrical energy. It will be understood that LEM 550 may be configured to operate substantially the same as LEMs 200 described above with respect to FIGS. 2-4.

With further reference to FIG. 5, piston 530 comprises a solid front section (combustor side) and a hollow back section (gas spring side). The area inside of the hollow section of the piston assembly 520, between the front face of piston 530 and spring rod 545, comprises a gas that serves as the gas spring 160, which provides at least some of the work required to perform a compression stroke. Piston 530 moves linearly within the combustor section 130 and the stator 210 of the LEM 550. The piston's motion is guided by bearings 560, 565, which may be solid bearings, hydraulic bearings, and/or air bearings. In the illustrated embodiment, the engine 500 includes both external bearings 560 and internal bearings 565. In particular, the external bearings 560 are located between the combustion section 130 and the LEM 550, and the internal bearings 565 are located on the inside of the hollow section of the piston 530. The external bearings 560 are externally fixed and do not move with the piston 530. The internal bearings 565 are fixed to the piston 530 and move with the piston 530 against the spring rod 545.

With continued reference to FIG. 5, the spring rod 545 serves as one face for the gas spring 160 and is externally fixed. The spring rod 545 has at least one seal 585 located at or near its end, which serves the purpose of keeping gas within the gas spring section 160. Magnets 525 are attached to the back of the piston assembly 520 and move linearly with the piston assembly 520 within the stator 210 of the LEM 550. The piston assembly 520 may have seals to keep gases in the respective sections. The illustrated embodiment includes (i) front seals 535 that are fixed to the piston 530 at or near its front end to keep to gases from being transferred from the combustion section 130, and (ii) back seals 555 that are fixed to the cylinder 105 and keep intake gases and/or blow-by gases from being transferred to the surroundings.

FIG. 6 is a cross-sectional drawing illustrating an embodiment of a gas spring rod, in accordance with some embodiments of the present disclosure. Specifically, the spring rod 645 includes a central lumen 610 that allows mass to be transferred between the gas spring section 160 to a reservoir section 620 that is in communication with the surroundings. The communication with the surroundings is controlled through a valve 630. The amount of mass in the gas spring 645 may be regulated to control the pressure within the gas spring 645 in accordance with some embodiments of the present disclosure.

FIG. 7 is a cross-sectional drawing illustrating a two-piston, integrated internal gas springs engine, in accordance with some embodiments of the present disclosure. Most of the elements of the two-piston embodiment are similar to those of the single-piston embodiment of FIG. 5, and like elements are labeled accordingly. In addition, the operating characteristics of the single- and two-piston embodiments are similar as described in previous embodiments, including all the aspects of the linear alternator, breathing, combustion strategies, etc.

As described above, a driver section may be implemented as a gas spring, and may include one or more other mechanisms as one of ordinary skill in the art would understand. Various implementations of driver sections will be described with reference to FIGS. 8-12 below. It will be understood to one of ordinary skill in the art that any of the driver sections and associated mechanisms illustrated in FIGS. 8-12 may be suitably implemented in the free-piston engines described in FIGS. 2-7 or any other suitable free-piston engines with driver sections.

Figure 8:
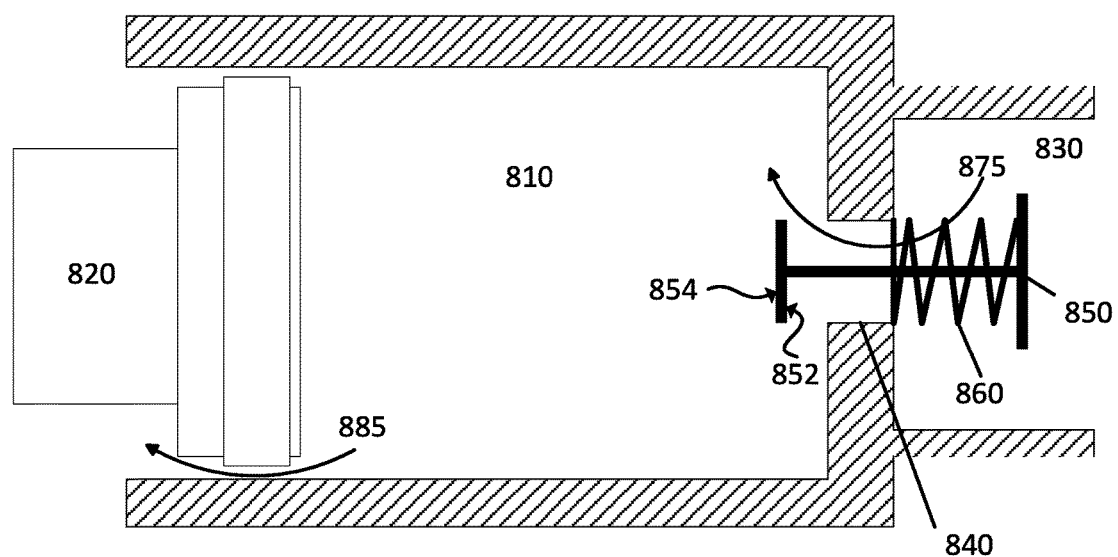
FIG. 8 is a cross-sectional drawing illustrating a gas spring with an intake port with a passive inlet valve, in accordance with some embodiments of the present disclosure.

FIG. 8 is a cross-sectional drawing illustrating a gas spring with an inlet port with a passive valve (referred to as a "passive inlet port"), in accordance with some embodiments of the present disclosure. As depicted in FIG. 8, gas spring 810 is in contact with piston assembly 820. It will be understood that in some embodiments, piston assembly 820 may be a free-piston assembly in contact with a combustion section as described above with respect to FIGS. 2-4. As described above with respect to the driver sections depicted in FIGS. 2-4, gas spring 810 may be capable of storing energy and providing energy to displace piston assembly 820 without the use of combustion. For example, energy may be stored in gas spring 810 as a result of compression of the gas therein by piston assembly 820 during an expansion stroke, and the stored energy may be used to displace piston assembly 820 to perform the subsequent stroke, such as a compression stroke or an exhaust stroke.

In some embodiments, it may be desirable to adjust the operation of gas spring 810. For example, in some embodiments, it may be desirable to adjust the pressure of the gas spring by adding or removing gas from the gas spring. Accordingly, as depicted in FIG. 8, an intake manifold 830 may be configured to provide make-up gas 875 to gas spring 810 via an inlet port 840. It will be understood that intake manifold 830 may be coupled to any suitable source of pressurized gas such as an air compressor, and that the pressure of said gas may be controlled by any suitable technique and mechanism. In some embodiments, the opening and closing of inlet port 840 may be dictated by the operation of a passive valve 850. As depicted, valve 850 may be coupled to a mechanical spring 860. In some embodiments, valve 850 may be biased to a closed position by mechanical spring 860 and may move to an open position based on changes in the pressure of the gas in gas spring 810 or the pressure of the gas in intake manifold 830. For example, valve 850 may move to an open position when the force applied to back surface 852 of valve 850 is greater than the force applied to front surface 854 of valve 850. It will be understood that the force applied to back surface 852 may be dependent on the pressure of the gas in intake manifold 830, the area of back surface 852, the spring constant associated with mechanical spring 860, and the distance required to move the valve from the closed position to the open position, and the force applied to front surface 852 may be dependent on the pressure of gas in gas spring 810 and the area of front surface 854. Accordingly, in some embodiments, when the pressure of the gas in gas spring reduces past a certain threshold minimum, mechanical spring 860 may "crack" and cause valve 850 to move to an open position, allowing make-up gas 875 to flow through inlet port 840 until the pressure of the gas in gas spring 810 is sufficient to cause valve 850 to move back to the closed position. As one of ordinary skill in the art would understand, the areas of front surface 854 and back surface 852, the spring constant of mechanical spring 860, and the distance required to move the valve from the closed position to the open position may be selected and/or designed to determine the relevant "cracking pressure" that may cause valve 850 to open as described above. It will be understood that the simplified mechanical spring shown in FIG. 8 is illustrative and in some embodiments, any suitable spring or springs may be used in place of or in addition thereto, including but not limited to one or more compression springs, tension springs, torsion springs, and any combination thereof. For example, the mechanical spring may include one or more coil or helical compression springs, one or more coil or helical tension springs, one or more coil or helical torsion springs, one or more leaf springs, any other suitable spring, and any suitable combination thereof.

Figure 9:
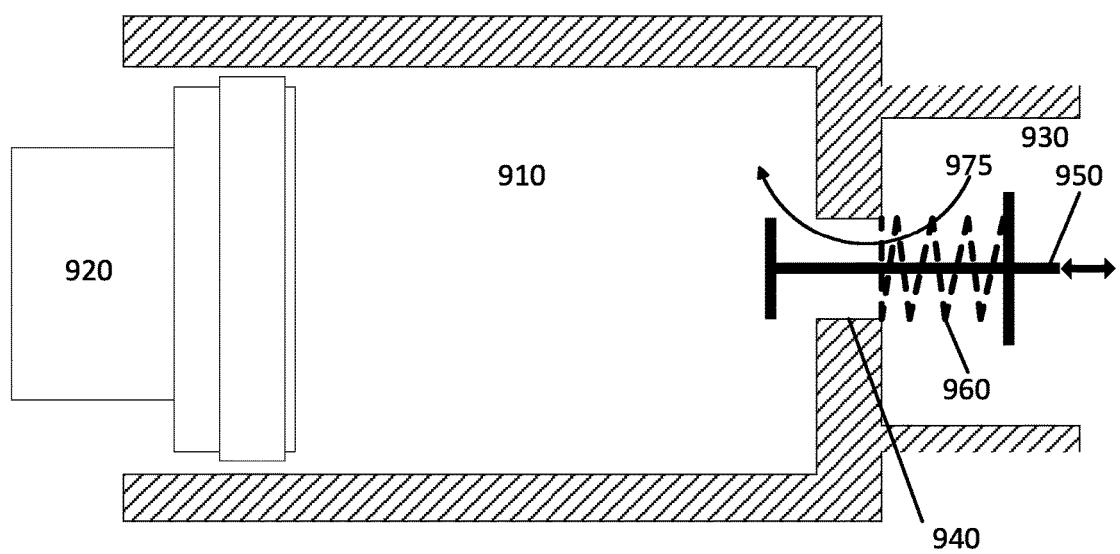
FIG. 9 is a cross-sectional drawing illustrating a gas spring with an intake port with an active inlet port, in accordance with some embodiments of the present disclosure.

FIG. 9 is a cross-sectional drawing illustrating a gas spring with an inlet port with an active valve (referred to as an "active inlet port"), in accordance with some embodiments of the present disclosure. Similar to FIG. 8 described above, FIG. 9 depicts gas spring 910 in contact with piston assembly 920. As described above with respect to piston assembly 820 of FIG. 8, in some embodiments, piston assembly 920 may be a free-piston assembly in contact with a combustion section as described above with respect to FIGS. 2-4 and gas spring 910 may be capable of storing energy and providing energy to displace piston assembly 920 without the use of combustion.

Gas spring 910 may operate similarly to gas spring 810 described above, with an intake manifold 930 configured to provide make-up gas 975 to gas spring 910 via an inlet port 940. In some embodiments, the opening and closing of inlet port 940 may be dictated by the operation of an active valve 950. Contrary to valve 850 depicted in FIG. 8, valve 950 may be configured to be actively actuated by force applied by any suitable actuator, including an electric actuator, mechanical actuator, or both. For example, an electric actuator may be coupled to a controller which may generate a control signal to cause the actuator to apply a force on valve 950 to move it from the closed position to the open position or from the open position to the closed position. In some embodiments, an optional mechanical spring 960 may be coupled to valve 950, and may bias the valve to be in the open or closed position by default.

Figure 10:
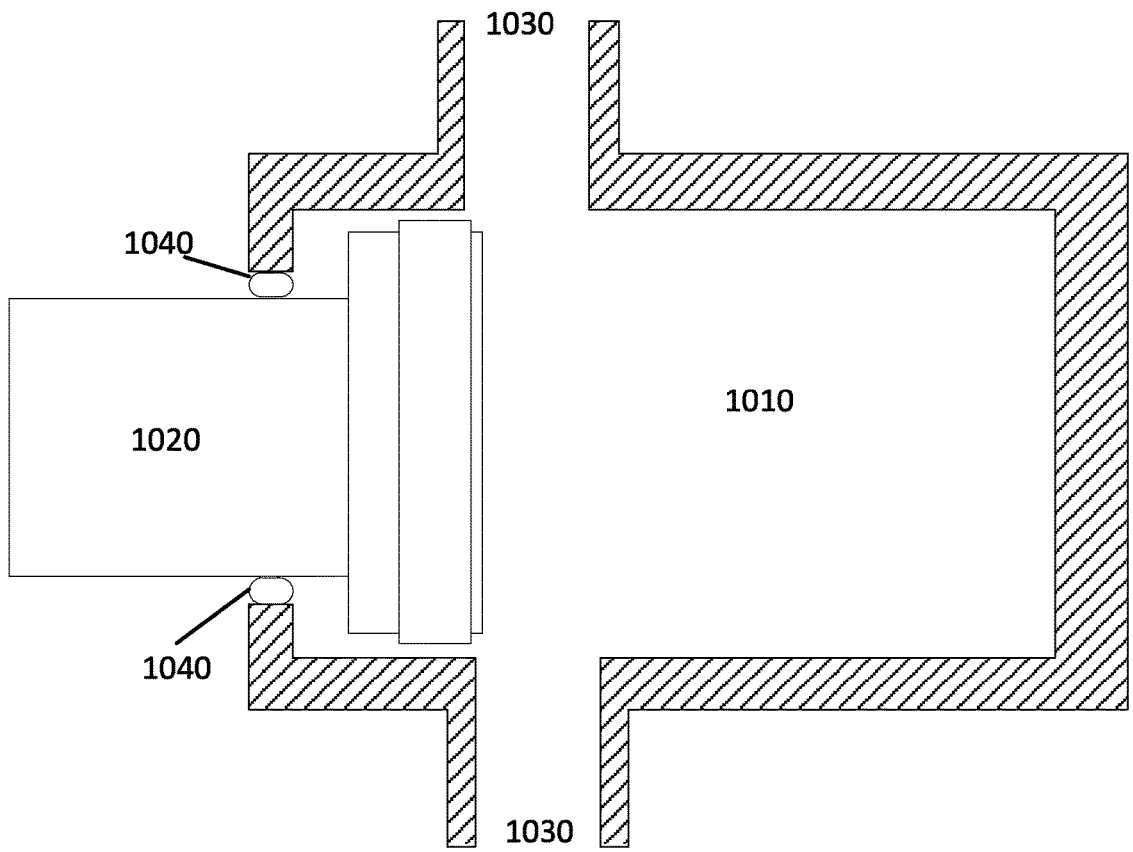
FIG. 10 is a cross-sectional drawing illustrating a gas spring with an intake port, in accordance with some embodiments of the present disclosure.

FIG. 10 is a cross-sectional drawing illustrating a gas spring with intake ports, in accordance with some embodiments of the present disclosure. Similar to FIGS. 8 and 9 described above, FIG. 10 depicts driver section or gas spring 1010 in contact with piston assembly 1020. As described above with respect to piston assembly 820 of FIG. 8, in some embodiments, piston assembly 1020 may be a free-piston assembly in contact with a combustion section as described above with respect to FIGS. 2-4 and gas spring 1010 may be capable of storing energy and providing energy to displace piston assembly 1020 without the use of combustion. FIG. 10 depicts inlet ports 1030 which may be utilized to provide gas to gas spring 1010. It will be understood that inlet ports 1030 may be coupled to any suitable sources of pressurized gas such as a compressor, and that the pressure of the pressurized gas may be controlled by any suitable technique and mechanism. As will be understood by one of ordinary skill in the art, the flow of gas into gas spring 1010 may be controlled by controlling the pressure of the gas provided at inlet ports 1030. For example, in some embodiments, gas may flow into gas spring 1010 via inlet ports 1030 if the pressure of the gas provided at inlet ports 1030 is greater than the pressure of the gas in gas spring 1010. Accordingly, in some embodiments, the pressure of the gas in gas spring 1010 may be detected by any suitable pressure sensor, and may be adjusted by controlling the pressure of gas provided via inlet ports 1030. As described above, in some embodiments, the driver section and the combustion section, and in turn, inlet ports 1030 may be maintained at or near atmospheric pressure. In such embodiments, it will be understood that seals 1040 may be optional because gas will not likely tend to leak past any clearances between piston assembly 1020 and the surrounding housing. In some embodiments, however, the driver section, the combustion section, and inlet ports 1030 need not be maintained at or near atmospheric pressure. In some embodiments, for example, if the inlet ports are maintained substantially above atmospheric pressure, seals 1040 may be used to keep gas from wasting away from driver section 1010 through any clearances between piston assembly 1020 and the surrounding housing.

Figure 11:
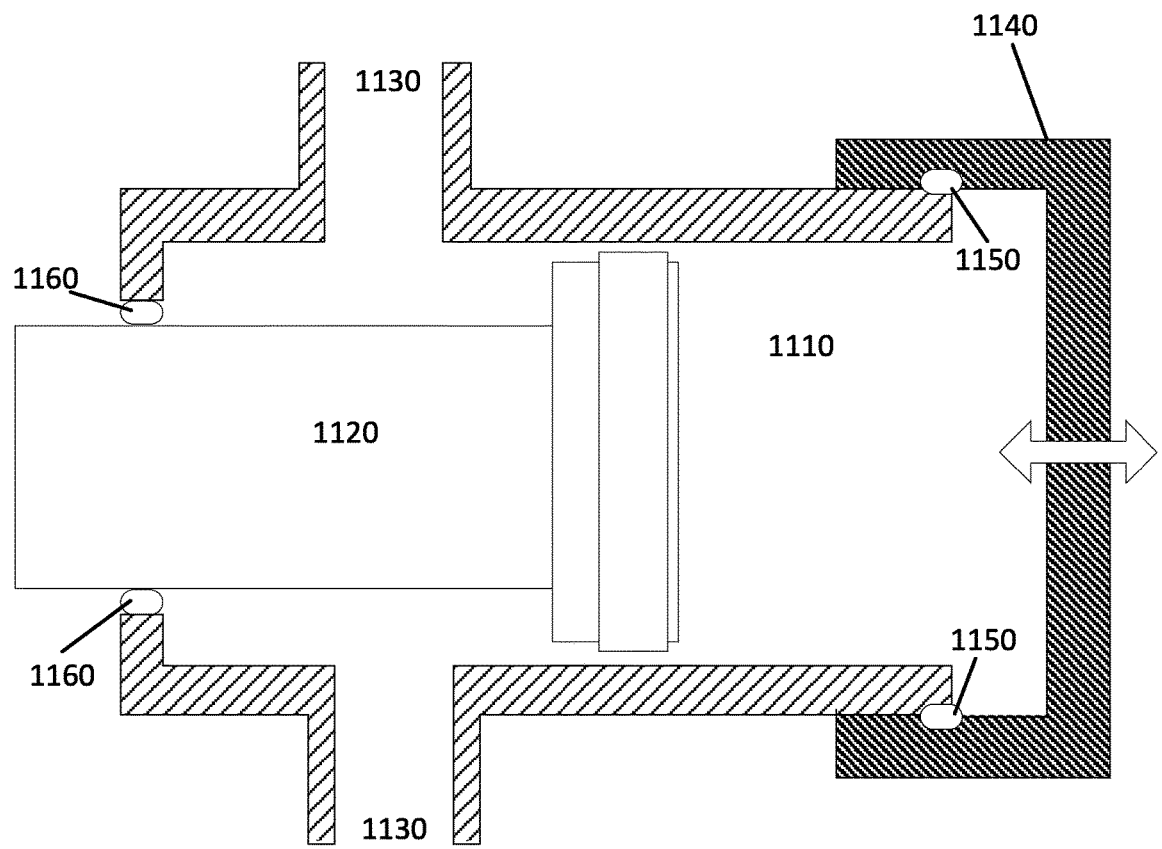
FIG. 11 is a cross-sectional drawing illustrating a gas spring with an adjustable head, in accordance with some embodiments of the present disclosure.

FIG. 11 is a cross-sectional drawing illustrating a gas spring with an adjustable head, in accordance with some embodiments of the present disclosure. Similar to FIG. 10, FIG. 11 depicts driver section or gas spring 1110 in contact with piston assembly 1120, inlet ports 1130 which may be utilized to provide gas to gas spring 1110, and optional sealing elements 1160 to keep gas from escaping. FIG. 11 also depicts an adjustable head 1140 and corresponding sealing elements 1150. In some embodiments, adjustable head 1140 may be configured to change the geometry of gas spring 1110. For example, adjustable head 1140 may translate or otherwise extend or retract in the directions indicated by the arrows in order to increase or decrease the dead volume of gas spring 1110. The translation, extension, retraction, or other suitable transformation of adjustable head 1140 may be controlled by a controller coupled to adjustable head 1140. It will be understood that by controlling the dead volume, the pressure of the gas in gas spring 1110 may also be controlled, provided that gas is kept in gas spring 1110 by use of sealing elements 1150 and/or optional sealing elements 1160. Accordingly, adjustable head 1140 may allow for additional control and adjustment of gas spring 1110, in accordance with some embodiments. It will be understood that the control and adjustment of the gas spring as described above may allow for control of the effective spring constant of the gas spring.

Figure 12:
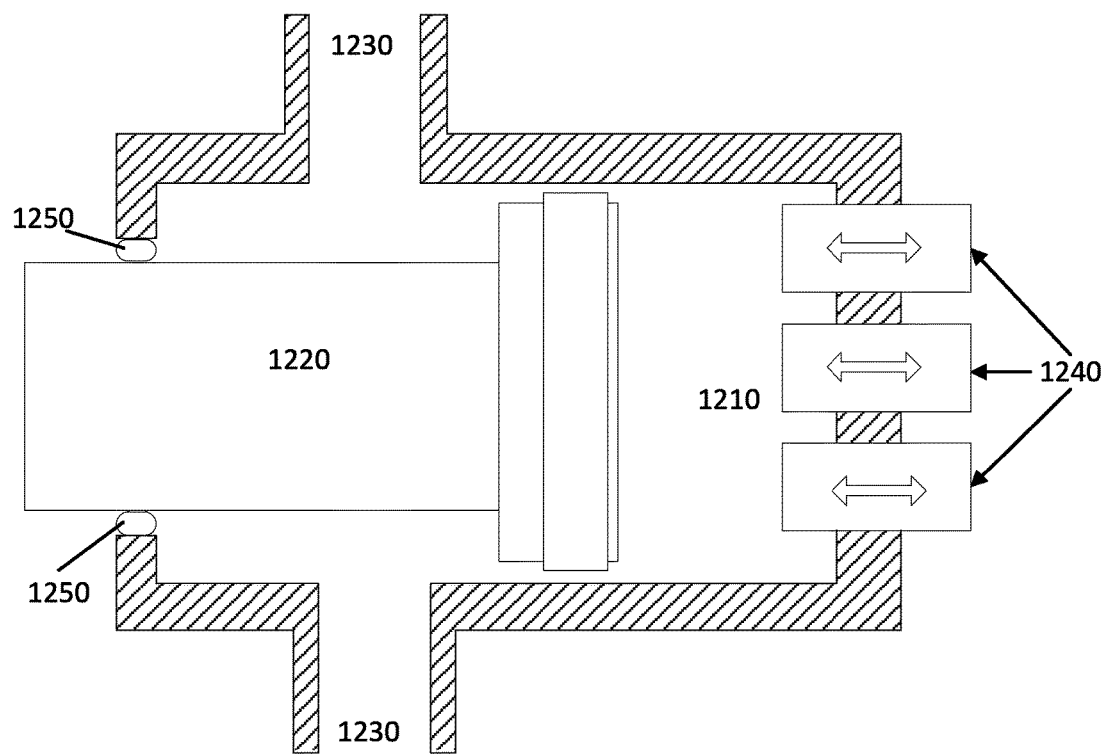
FIG. 12 is a cross-sectional drawing illustrating a gas spring with adjustable components, in accordance with some embodiments of the present disclosure.

FIG. 12 is a cross-sectional drawing illustrating a gas spring with adjustable components, in accordance with some embodiments of the present disclosure. Similar to FIGS. 10 and 11, FIG. 12 depicts gas spring 1210 in contact with piston assembly 1220, inlet ports 1230 which may be utilized to provide gas to gas spring 1210, and optional sealing elements 1250 to keep gas from escaping. FIG. 12 also depicts adjustable components 1240. Although shown for illustrative purposes as three components, it will be understood that any suitable number and configuration of adjustable components 1240 may be used in accordance with embodiments of the present disclosure. In some embodiments, adjustable components 1240 may be configured to change the geometry of gas spring 1210. For example, adjustable components 1240 may be screws, bolts, lugs, or other mechanical structures that are configured to translate or otherwise extend or retract in the directions indicated by the arrows in order to increase or decrease the dead volume of gas spring 1210. The translation, extension, retraction, or other suitable transformation of adjustable components 1240 may be controlled by a controller coupled to adjustable components 1240. It will be understood that by controlling the dead volume, the pressure of the gas in gas spring 1210 may also be controlled. Accordingly, adjustable components 1240 may allow for additional control and adjustment of gas spring 1210, in accordance with some embodiments. As noted above, it will be understood that the control and adjustment of the gas spring as described above may allow for control of the effective spring constant of the gas spring.

Figure 13:
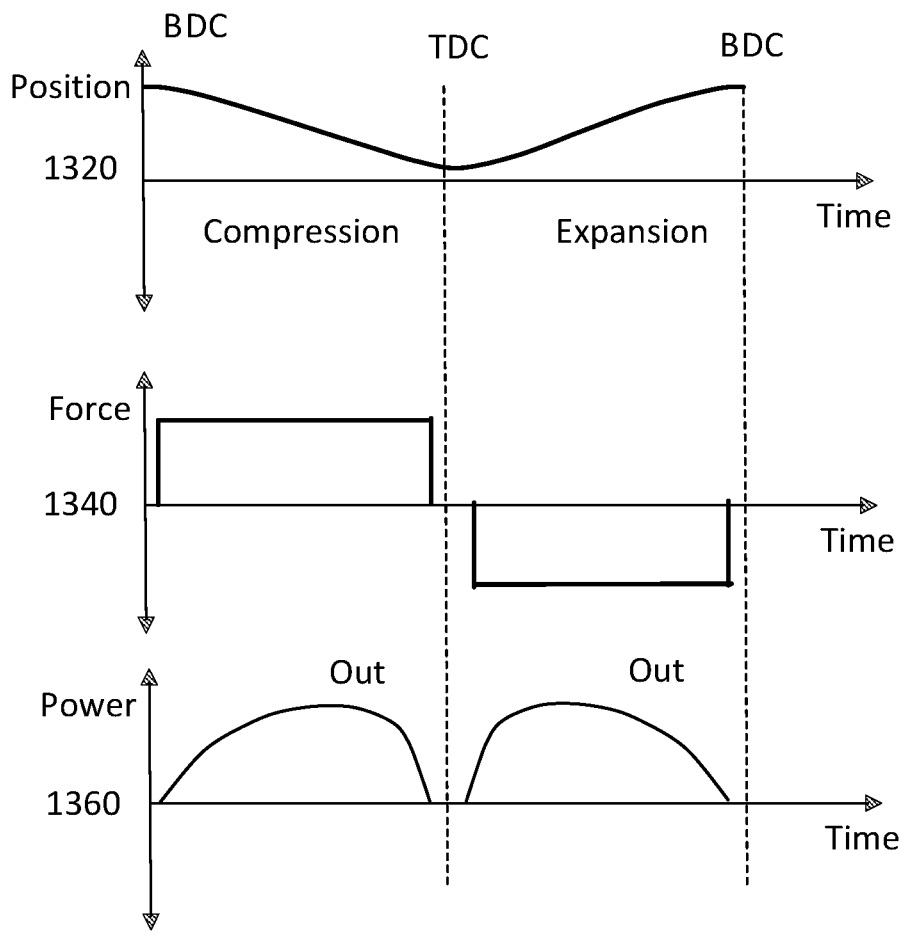
FIG. 13 is a diagram illustrating the position, force, and power profiles of a free-piston engine over a compression and an expansion stroke, in accordance with some embodiments of the present disclosure.

FIG. 13 is a diagram illustrating the position, force, and power profiles of a free-piston engine, in accordance with some embodiments of the present disclosure. As shown, the diagram illustrates exemplary position 1320, force 1340, and power 1360 profiles over time for a free-piston engine with a two-stroke piston cycle including a compression stroke and a power stroke. With reference to position profile 1320, as labeled in FIG. 13, for reference purposes, the positive direction corresponds to the direction from TDC to BDC. For example, in the free-piston assemblies of FIGS. 2-4, the centerline would correspond to the origin, and the direction away from the centerline would be the positive direction for each free-piston assembly. As can be seen by position profile 1320, the piston assembly starts the compression cycle at BDC and progresses to TDC, at which point the power cycle begins. During the power cycle, the piston assembly progresses back to BDC.

With reference to force profile 1340, the force is positive when applied in a direction from TDC to BDC. For example, in the free-piston assemblies of FIGS. 2-4, force applied in the direction away from the centerline would be a positive force. As can be seen in force profile 1340, during the compression cycle, a relatively constant positive force may be applied to the piston assembly, and during the power cycle, the force may be negative (in the direction towards the centerline). It will be understood that the force applied need not be constant, and that in some embodiments, a variable force profile may be applied, for example, to produce a relatively constant power output. It will also be understood that in some embodiments, and as depicted herein, forces may not be applied when the piston assembly velocity is relatively low, due to the inefficiency of doing so.

The power output is the negative product of the force and velocity of the piston assembly. Referring specifically to power profile 1360, it can be seen that, in the ideal case illustrated, no power need be input to the system in order to perform the compression and power strokes of the piston cycle. Rather, as described above, in the ideal case, there is sufficient energy stored in the at least one driver section during the power stroke to perform the subsequent compression stroke without additional energy input into the system during the compression stroke.

Figure 14:
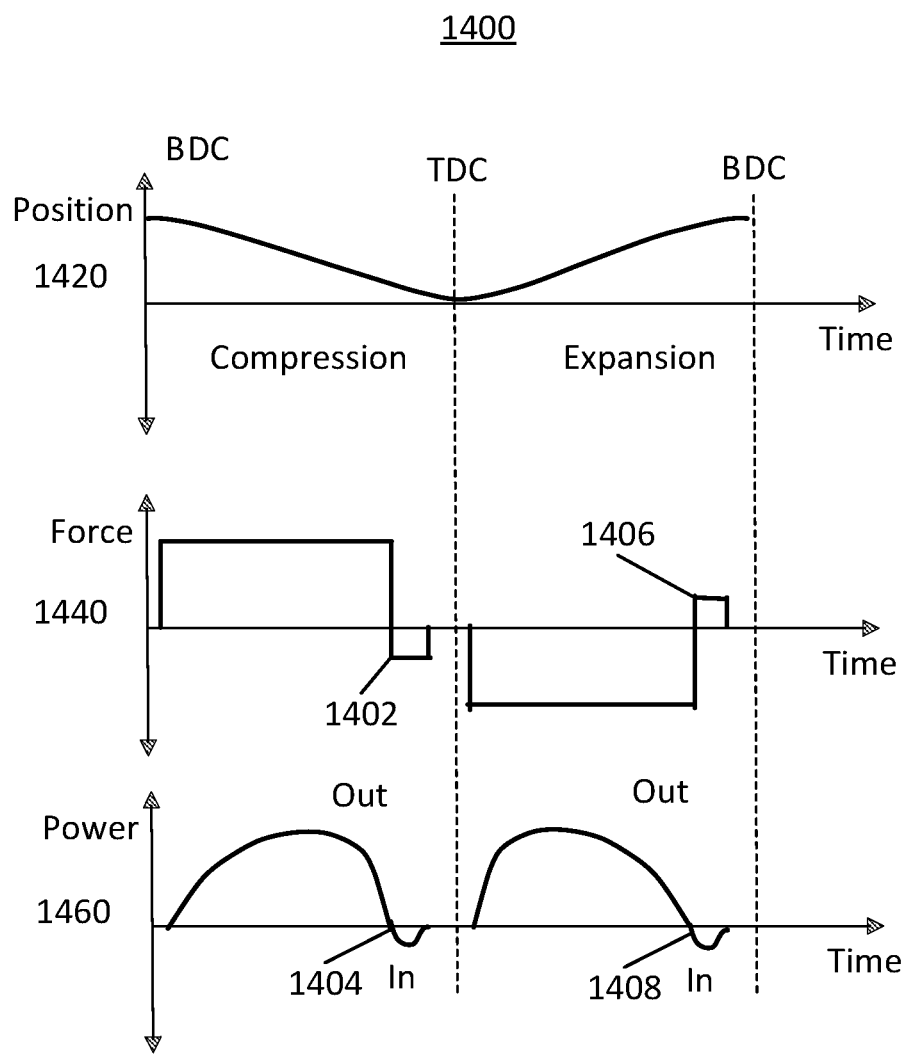
FIG. 14 is a diagram illustrating the position, force, and power profiles of a free-piston engine over a compression and an expansion stroke, in accordance with some embodiments of the present disclosure.

Although in an ideal scenario, it may be desirable to avoid any power input during operation of the compression and power strokes as described with respect to FIG. 13, in some embodiments it may be necessary or desirable to provide some power input. Accordingly, FIG. 14 is another diagram illustrating the position, force, and power profiles of a free-piston engine, in accordance with some embodiments of the present disclosure. Similar to FIG. 13, FIG. 14 illustrates exemplary position 1420, force 1440, and power 1460 profiles over time for a free-piston engine with a two-stroke piston cycle including a compression stroke and a power stroke. While the position profile 1420 is generally similar to that of position profile 1320 illustrated in FIG. 13, it will be understood that the force profile 1440 and the power profile 1460 may differ from those illustrated in FIG. 13. With reference to force profile 1440 during the compression stroke, it can be seen at 1402 that a force may be applied in the opposite direction as originally applied for a brief period. This is also reflected in power profile 1460, where a negative power showing power input for the same brief period may be seen at 1404. While this force application and power input may occur for a number of reasons, in some embodiments, this may be done in order to control the speed of the piston assembly or otherwise ensure that the piston assembly reaches the appropriate TDC before the power stroke. For example, a force may be applied to increase the speed of the piston assembly. Similarly, with further reference to force profile 1440 during the power stroke, it can be seen at 1406 that a force may be applied in the opposite direction as the rest of the power stroke for a brief period, which is also reflected in power profile 1460, where a negative power showing power input for the same brief period may be seen at 1408. As described above, this applied force and input power may occur for a number of reasons, but in some embodiments, force may be applied in this way and power input in order to control the speed of the piston assembly or otherwise ensure that the piston assembly reaches the appropriate BDC point before the subsequent compression stroke. For example, a force may be applied to increase the speed of the piston assembly as described above.

Although the provision of input power during compression and or power stroke described with respect to FIG. 14 is not necessarily ideal operation, it will be understood that the net electrical energy output over each stroke is still greater than zero (i.e., there is no net electrical energy input over each stroke). This is evident from power profile 1460, in which it can be seen that the integral over each stroke, represented by the area of the curve above zero subtracted by the area of the curve below zero, is substantially greater than zero. Accordingly, the amount of electrical energy output by the system over each stroke is greater than the electrical energy input to control the piston assembly position as described above. As used herein, the "net electrical energy" refers to the electrical energy transfer into or out of the LEM such as that described above with respect to FIGS. 2-4. In some embodiments, the LEM may include a stator coupled to power electronics (including, e.g., any DC bus, IGBTs, and/or any other suitable components) and/or a grid-tie inverter. Accordingly, in some embodiments, while some electrical energy may be input into the LEM via power electronics and/or a grid-tie inverter coupled to the LEM, the net electrical energy over a given stroke as described above would be output from the LEM to the power electronics and/or grid-tie inverter.

As stated, the embodiment described above with respect to FIGS. 2-4 includes a two-piston, single-combustion section, two-stroke internal combustion engine 100. Described below, and illustrated in the corresponding figures, is a control system applicable to a free-piston combustion engine generally. Accordingly, as described above, the control system is applicable to other free-piston combustion engine architectures, such as those described in the previously referenced and incorporated U.S. Pat. No. 8,662,029. As would be appreciated by those of ordinary skill in the art, various modifications and alternative configurations may be utilized, and other changes may be made, without departing from the scope of the disclosure. For example, in addition to the two-piston architectures described above with respect to FIGS. 2-4, the control system described herein is applicable to, for example, single-piston architectures. Similarly, in addition to the two-stroke engine described above with respect to FIG. 3, the control system described herein is also applicable to, for example, four-stroke engines.

It will be understood from the above disclosure that the driver section may be configured (e.g., including by way of control circuitry) to avoid any need for electrical energy input or net electrical energy input during a stroke subsequent to an expansion stroke, from, for example, an LEM. As opposed to avoiding the use of an LEM for energy input coincidentally only under certain conditions, in some embodiments, the free-piston engine may be specifically configured for the purpose of avoiding net energy input during the stroke that occurs following an expansion stroke (e.g., the compression stroke following a power stroke). In some embodiments, the free-piston engine may be specifically configured to necessarily cause the stroke following an expansion stroke to be performed without net electrical energy input.

Figure 15:
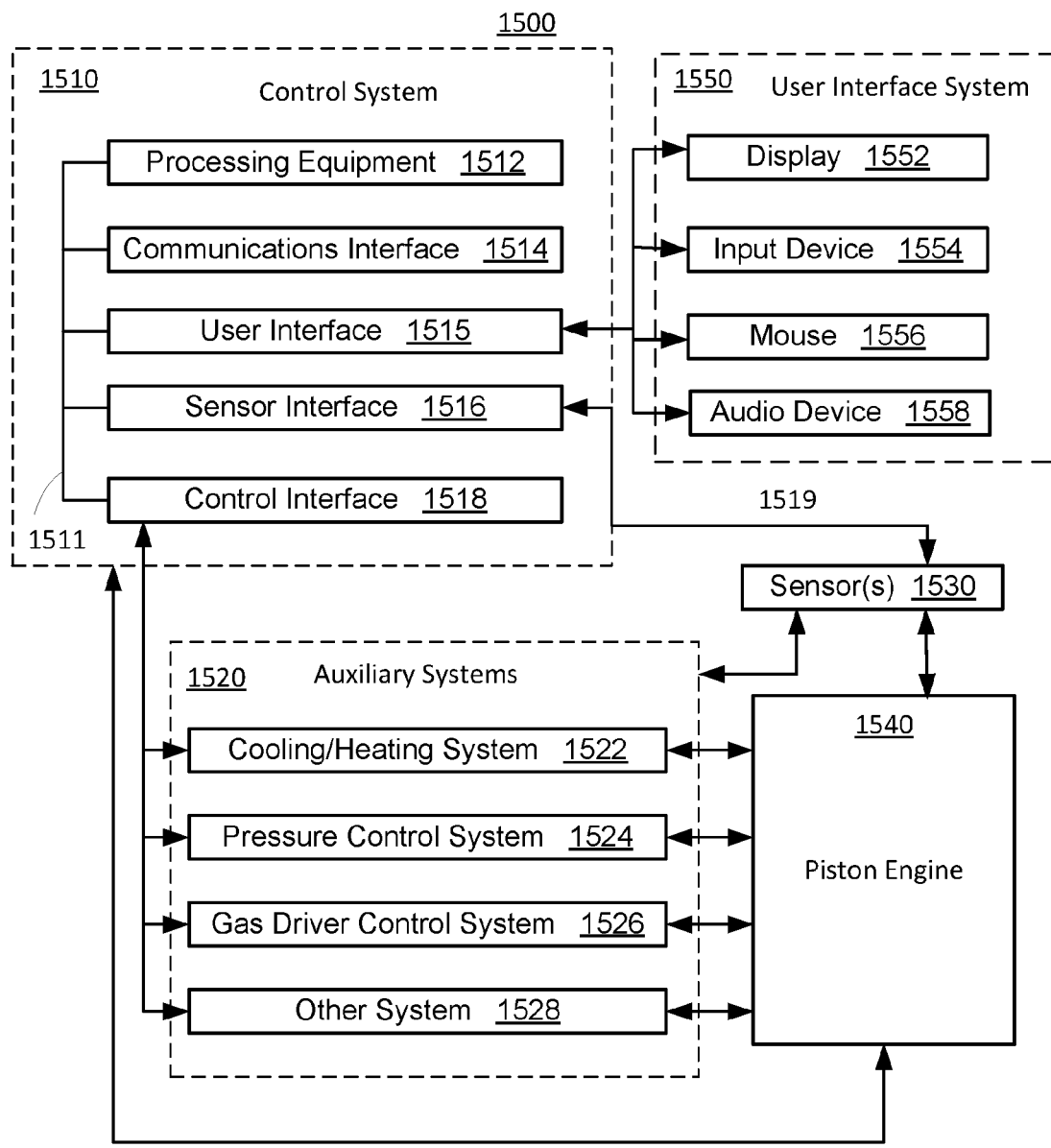
FIG. 15 is a block diagram of an illustrative piston engine system in accordance with some embodiments of the present disclosure.

FIG. 15 is a block diagram of an illustrative piston engine system 1500 having control system 1510 for a piston engine 1540, in accordance with some embodiments of the present disclosure. Piston engine 1540 may be, for example, any suitable free-piston engine as described above with respect to FIGS. 2-7. Control system 1510 may communicate with one or more sensors 1530 coupled to piston engine 1540. Control system 1510 may be configured to communicate with auxiliary systems 1520, which may be used to adjust aspects or properties of piston engine 1540. In some embodiments, more than one piston engine may be controlled by control system 1510. For example, control system 1510 may be configured to communicate with auxiliary systems and sensors corresponding to any number of piston engines. In some embodiments, control system 1510 may be configured to interact with a user via user interface system 1550.

Control system 1510 may include processing equipment 1512, communications interface 1514, sensor interface 1516, control interface 1518, any other suitable components or modules, or any combination thereof. Control system 1510 may be implemented at least partially in one or more integrated circuits, ASIC, FPGA, microcontroller, DSP, computers, terminals, control stations, handheld devices, modules, any other suitable devices, or any combination thereof. In some embodiments, the components of control system 1510 may be communicatively coupled via individual communications links or a communications bus 1511, as shown in FIG. 15. Processing equipment 1512 may include any suitable processing circuitry, such as one or more processors (e.g., a central processing unit), cache, random access memory (RAM), read only memory (ROM), any other suitable hardware components or any combination thereof that may be configured (e.g., using software, or hard-wired) to process information regarding piston engine 1540, as received by sensor interface 1516 from sensor(s) 1530. Sensor interface 1516 may include a power supply for supplying power to sensor(s) 1530, a signal conditioner, a signal pre-processor, any other suitable components, or any combination thereof. For example, sensor interface 1516 may include a filter, an amplifier, a sampler, and an analog to digital converter for conditioning and pre-processing signals from sensor(s) 1530. Sensor interface 1516 may communicate with sensor(s) 1530 via communicative coupling 1519, which may be a wired connection (e.g., using IEEE 802.3 ethernet, or universal serial bus interface), wireless coupling (e.g., using IEEE 802.11 "Wi-Fi", or Bluetooth), optical coupling, inductive coupling, any other suitable coupling, or any combination thereof. Control system 1510, and more particularly processing equipment 1512, may be configured to provide control of piston engine 1540 over relevant time scales. For example, a change in one or more temperatures may be controllable in response to one or more detected engine operating characteristics, and the control may be provided on a time scale relevant to operation of the piston engine (e.g., fast enough response to prevent overheating and/or component failure, to adequately provide apex control as described below, to allow for shutdown in the case of a diagnostic event, and/or for adequate load tracking).

Sensor(s) 1530 may include any suitable type of sensor, which may be configured to sense any suitable property or aspect of piston engine 1540. In some embodiments, sensor (s) may include one or more sensors configured to sense an aspect and/or property of a system of auxiliary systems 1520. In some embodiments, sensor(s) 1530 may include a temperature sensor (e.g., a thermocouple, resistance temperature detector, thermistor, or optical temperature sensor) configured to sense the temperature of a component of piston engine 1540, a fluid introduced to or recovered from piston engine 1540, or both. In some embodiments, sensor (s) 1530 may include one or more pressure sensors (e.g., piezoelectric pressure transducers, strain-based pressure transducers, or gas ionization sensors) configured to sense a pressure within a section of piston engine 1540 (e.g., a combustion section, or gas driver section), of a fluid introduced to or recovered from piston engine 1540, or both. In some embodiments, sensor(s) 1530 may include one or more force sensors (e.g., piezoelectric force transducers or strain-based force transducers) configured to sense a force within piston engine 1540 such as a tensile, compressive or shear force (e.g., which may indicate a friction force or other relevant force information, pressure information, or acceleration information). In some embodiments, sensor(s) 1530 may include one or more current and/or voltage sensors (e.g., an ammeter and/or voltmeter coupled to a LEM of piston engine 1540) configured to sense a voltage, current, power output and/or input (e.g., current multiplied by voltage), any other suitable electrical property of piston engine 1540 and/or auxiliary systems 1520, or any combination thereof. In some embodiments, sensor(s) 1530 may include one or more sensors configured to sense the position of the piston assembly and/or any other components of the engine, the speed of the piston assembly and/or any other components of the engine, the acceleration of the piston assembly and/or any other components of the engine, the rate of flow, oxygen or nitrogen oxide emission levels, other emission levels, any other suitable property of piston engine 1540 and/or auxiliary systems 1520, or any combination thereof.

Control interface 1518 may include a wired connection, wireless coupling, optical coupling, inductive coupling, any other suitable coupling, or any combination thereof, for communicating with one or more of auxiliary systems 1520. In some embodiments, control interface 1518 may include a digital to analog converter to provide an analog control signal to any or all of auxiliary systems 1520.

Auxiliary systems 1520 may include a cooling system 1522, a pressure control system 1524, a gas driver control system 1526, and/or any other suitable control system 1528. Cooling/heating system 1522 may include a pump, fluid reservoir, pressure regulator, bypass, radiator, fluid conduits, electric power circuitry (e.g., for electric heaters), any other suitable components, or any combination thereof to provide cooling, heating, or both to piston engine 1540. Pressure control system 1524 may include a pump, compressor, fluid reservoir, pressure regulator, fluid conduits, any other suitable components, or any combination thereof to supply (and optionally receive) a pressure controlled fluid to piston engine 1540. Gas driver control system 1526 may include a compressor, gas reservoir, pressure regulator, fluid conduits, any other suitable components, or any combination thereof to supply (and optionally receive) a driver gas to piston engine 1540. In some embodiments, gas driver control system may include any suitable components to control any of the gas spring components described above with respect to FIGS. 5-9. In some embodiments, other system 1528 may include a valving system such as, for example, a cam-operated system or a solenoid system to supply oxidizer and/or fuel to piston engine 1540.

User interface 1515 may include a wired connection, wireless coupling, optical coupling, inductive coupling, any other suitable coupling, or any combination thereof, for communicating with one or more of user interface systems 1550. User interface systems 1550 may include display 1552, input device 1554, mouse 1556, audio device 1558, a remote interface accessed via website, mobile application, or other internet service, any other suitable user interface devices, or any combination thereof. In some embodiments, a remote interface may be remote from the engine but in proximity to the site of the engine. In other embodiments, a remote interface may be remote from both the engine and the site of the engine. Display 1552 may include a display screen such as, for example, a cathode ray tube screen, a liquid crystal display screen, a light emitting diode display screen, a plasma display screen, any other suitable display screen that may provide graphics, text, images or other visuals to a user, or any combination of screens thereof. In some embodiments, display 1552 may include a touchscreen, which may provide tactile interaction with a user by, for example, offering one or more soft commands on a display screen. Display 1552 may display any suitable information regarding piston engine 1540 (e.g., a time series of a property of piston engine 1540), control system 1510, auxiliary systems 1520, user interface system 1550, any other suitable information, or any combination thereof. Input device 1554 may include a QWERTY keyboard, a numeric keypad, any other suitable collection of hard command buttons, or any combination thereof. Mouse 1556 may include any suitable pointing device that may control a cursor or icon on a graphical user interface displayed on a display screen. Mouse 1556 may include a handheld device (e.g., capable of moving in two or three dimensions), a touchpad, any other suitable pointing device, or any combination thereof. Audio device 1558 may include a microphone, a speaker, headphones, any other suitable device for providing and/or receiving audio signals, or any combination thereof. For example, audio device 1558 may include a microphone, and processing equipment 1512 may process audio commands received via user interface 1515 caused by a user speaking into the microphone.

In some embodiments, control system 1510 may be configured to receive one or more user inputs to provide control. For example, in some embodiments, control system 1510 may override control settings based on sensor feedback, and base a control signal to auxiliary system 1520 on one or more user inputs to user interface system 1550. In a further example, a user may input a set-point value for one or more control variables (e.g., temperatures, pressures, flow rates, work inputs/outputs, or other variables) and control system 1510 may execute a control algorithm based on the set-point value.

In some embodiments, operating characteristics (e.g., one or more desired property values of piston engine 1540 or auxiliary systems 1520) may be pre-defined by a manufacturer, user, or both. For example, particular operating characteristics may be stored in memory of processing equipment 1512, and may be accessed to provide one or more control signals. In some embodiments, one or more of the operating characteristics may be changed by a user. Control system 1510 may be used to maintain, adjust, or otherwise manage those operating characteristics.

As described above, in some implementations, the driver section may be configured to store a particular amount of energy during an expansion stroke of the engine. In some embodiments, as described above, the driver section may be configured to store enough energy during expansion to provide the energy required for a subsequent stroke, i.e. the stroke that occurs after the expansion stroke. For example, in an engine with a two-stroke cycle, the driver section may be configured to store enough energy during expansion to provide the energy required for a subsequent compression stroke. In an engine with a four-stroke cycle, for example, the driver section may be configured to store enough energy during the expansion stroke to provide the energy required for a subsequent exhaust stroke. In some embodiments, the driver section may be configured to store more than the amount required for a subsequent stroke. In some embodiments, the excess amount of energy, or a portion of the excess amount of energy, stored in the driver section may be converted by one or more LEMs into electrical energy during the subsequent stroke. For example, one or more LEMs may be configured to extract work during the power stroke of the free-piston combustion engine by converting a portion of the kinetic energy of the piston assembly into electrical energy. In some embodiments, the one or more LEMs may be further configured to extract at least some of the work provided by a driver section during the compression stroke of the free-piston combustion engine. That is, the potential energy stored in the driver section during the expansion stroke is converted into kinetic energy of the piston assembly during the subsequent stroke. At least some of this kinetic energy may be converted during the subsequent stroke into electrical energy by one or more LEMs. It will be understood, as described above, that when the LEMs are configured to extract electrical energy during expansion strokes and the subsequent strokes, they may be reduced in size and/or weight, thereby saving on material weight and costs.

In some implementations, the amount and manner of energy stored in the driver section and energy extracted by the LEMs may be controlled by, for example, control system 1510. For example, sensors 1530 may be used to measure any one or more operating characteristics of the free-piston combustion engine, such as the position of the piston assembly, the speed of the piston assembly, the acceleration of the piston assembly, the pressure in the combustion section, the temperature of the combustion section, the potential energy of the combustion section, the chemical energy in the combustion section, the pressure in the driver section (e.g., the pressure of driver gas or the pressure of springs used as the driver section as described above), the potential energy of the driver section (e.g., the potential energy of the driver gas or the force of the springs used as the driver section as described above), the temperature of gas in the driver section, electric output, indicated work of the combustor or the driver section, the electrical efficiency, the indicated efficiency of the combustor or the driver section, the temperature of the LEM (e.g., stator or magnets), the combustor air flow rate, the combustor fuel flow rate, the driver section make-up air flow rate, the temperature of the piston assembly, the previous cycle performance, environmental temperature and pressure (e.g., the temperature and pressure of areas surrounding the engine), emissions characteristics, any other suitable characteristic, or any suitable combination thereof. Using sensor interface 1516, control system 1510 may generate one or more signals indicative of the sensed one or more characteristics to be input into processing equipment 1512.

Processing equipment 1512 may generate one or more control signals based at least in part on the signals received from sensors 1530 and sensor interface 1516. In some embodiments, the processing equipment 1512 may determine the amount of energy required for a given piston stroke based on signals received from sensors 1530 and sensor interface 1516, and control signals may be used by processing equipment 1512 to control the amount of kinetic energy of the piston assembly to be stored in the driver section as potential energy. Processing equipment 1512 may also determine how much of the kinetic energy of the piston assembly to convert into electrical energy and cause that conversion to occur using any suitable control mechanism. As used herein, the term "control mechanism" may refer to any suitable software, hardware, and technique for controlling of any of the aforementioned operating characteristics and any suitable combination thereof to obtain the desired outcome. For example, the one or more control signals may control operating characteristics of the engine in order to store, in the driver section, the requisite energy for a subsequent stroke that was determined to be needed by the processing equipment 1512. For example, the one or more control signals may control the operating characteristics of the engine in order to cause the desired amount of kinetic energy of the piston assembly to be stored in the driver section during an expansion stroke of the engine, and subsequently to cause the desired amount of kinetic energy of the piston assembly to be converted into electrical energy by the LEM. As described above, the amount of energy required for a subsequent stroke (e.g., either a compression or exhaust stroke), may depend on the desired compression ratio, the pressure and temperature of the combustion section at the beginning of the subsequent stroke, the mass of the piston assembly, the desired combustion timing, barometric pressure, ambient temperature, and desired phasing characteristics with respect to other engines. The amount of kinetic energy to be converted into electrical energy may be determined based on a difference between the amount stored in the driver section during the expansion stroke and the amount needed for the subsequent stroke, which may depend at least in part on desired parameters associated with the engine. In some embodiments, the amount of kinetic energy to be converted into electrical energy may be determined based on the desired power output from the engine, the desired emissions output from the engine, the desired efficiency of the engine, the desired load tracking, any other desired parameter, or any suitable combination thereof. For example, if the driver section becomes less efficient, the amount of kinetic energy converted into electrical energy during the power stroke may be increased, and the amount of kinetic energy converted into electrical energy during the compression stroke may be decreased. Alternatively, for example, if the driver section becomes more efficient, the amount of kinetic energy converted into electrical energy during the power stroke may be decreased, and the amount of kinetic energy converted into electrical energy during the subsequent stroke may be increased.

In addition to controlling an amount of kinetic energy of the piston assembly to convert into electrical energy, the control signals may be used to control the manner in which the LEM converts kinetic energy into electrical energy. For example, the control signal may cause the conversion to take place in either direction at a constant rate, a non-constant rate, a variable rate or any combination thereof.

In some implementations, one or more parameters of the free-piston combustion engine may be used by processing equipment 1512 to determine the amount of work to extract during the compression stroke of the engine. In some embodiments, the desired parameter may be input by a user via user interface system 1550. For example, a user may input a desired power output for the free-piston combustion engine via user interface system 1550. In other embodiments, a desired parameter may be received from an external device via communications interface 1514. For example, desired power output may be received from an external device indicating a desired power output based on historical power requirements, future forecasted power requirements, or any suitable combination thereof.

In some embodiments, processing equipment 1512 may determine one or more operating characteristics of the engine that yield the desired parameter based on any suitable relationship between the parameter and the one or more operating characteristics. For example, processing equipment 1512 may determine the velocity, acceleration, or other operating characteristic of the piston(s) based on the desired power output and the relationship of the operating characteristic to the desired power output. Processing equipment 1512 may then determine the amount of compression work required to generate the operating characteristics determined by processing equipment 1512. Based on the required amount of compression work, processing equipment 1512 may control the engine to extract a suitable amount of work during the compression stroke of the engine such that the remaining compression work acting on the piston will yield the desired operating characteristic or characteristics, which will in turn yield the desired power output. Although the embodiments are described above in terms of a desired power output, as described above, the processing equipment may optimize operating characteristics of the engine based on a desired efficiency, a desired emission output, desired load tracking, or any other suitable parameter of the engine.

In some embodiments, the aforementioned work extraction, engine parameters, and operating characteristics may be coordinated amongst several piston engines controlled by control system 1510. For example, kinetic energy of one piston engine may be converted into electrical energy and the resulting electrical energy may be converted into kinetic energy of another piston engine based on the desired engine parameters, the corresponding operating characteristics, and the amount of work required for compression and/or exhaust strokes.

Although embodiments are described above in terms of work extraction during a compression stroke or exhaust stroke of the free-piston combustion engine, it will be readily understood by those with skill in the art that in some embodiments the conversion of kinetic energy to electric energy and electric energy to kinetic energy may be more generally applied by control system 1510. In some embodiments, kinetic energy of the piston may be converted into electric energy continuously during operation of the engine, irrespective of the stroke or cycle of the engine. In some embodiments, kinetic energy of the piston assemblies may be converted into electrical energy continuously during operation of the engine, irrespective of the stroke or cycle of the engine. In other embodiments, the control system 1510 may apply an arbitrary force on one or more piston assemblies of the engine based on any desired engine parameter or operating characteristic, and irrespective of any desired or required work extraction. For example, the control system 1510 may control operation characteristics of the engine to apply forces on two pistons in order to synchronize the pistons such that they reach TDC and/or BDC at substantially the same time. As another example, the control system 1510 may control operation characteristics of the engine to apply forces on pistons in order to phase separate engines such that they do not simultaneously operate at the same engine cycles in order to provide for a more continuous power flow. As another example, the control system 1510 may control operation characteristics of the engine to obtain a desired apex point of the piston.

Figure 16:
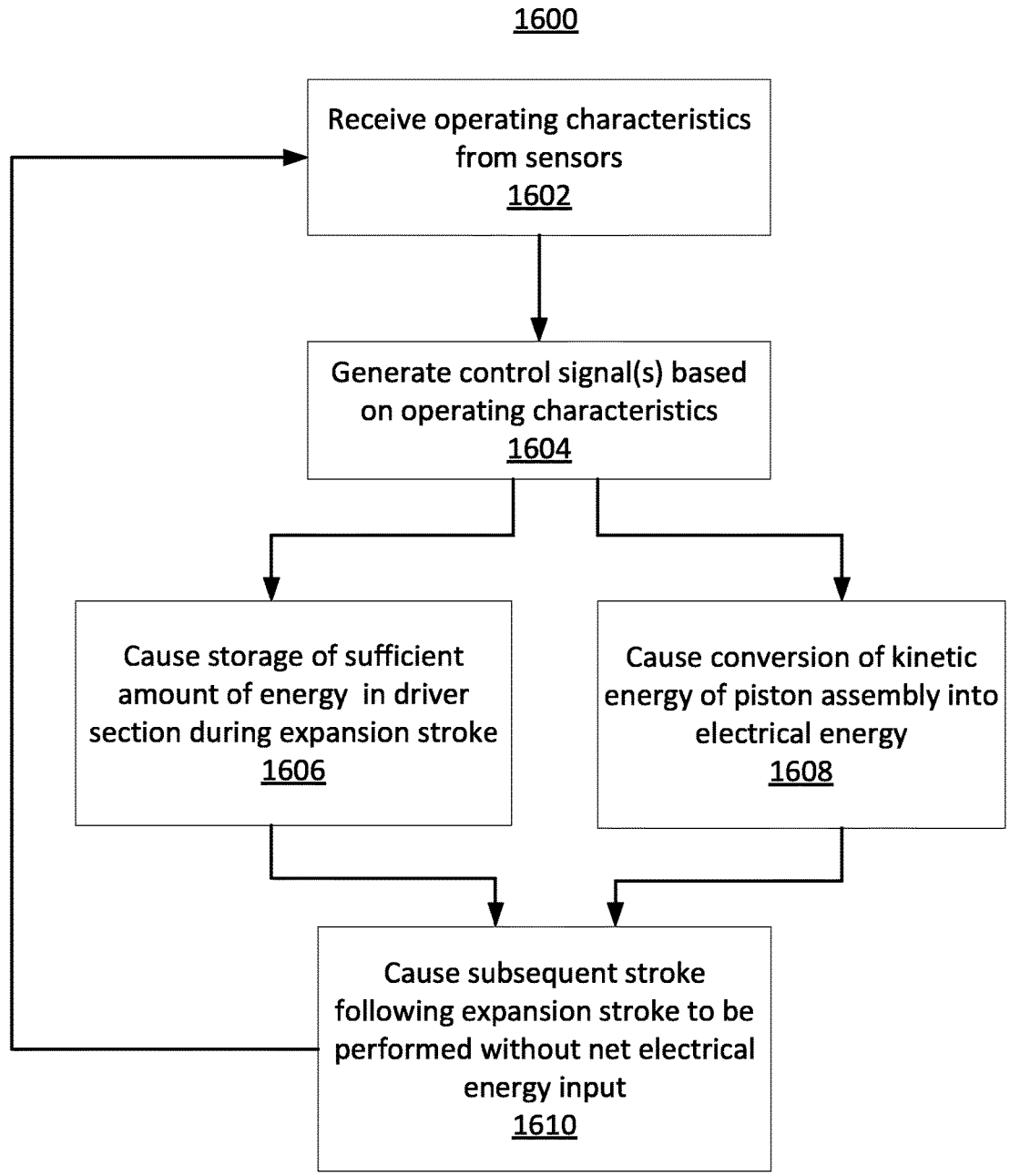
FIG. 16 shows a flow diagram of illustrative steps for controlling a free-piston engine in accordance with some embodiments of the present disclosure.

FIG. 16 shows a flow diagram 1600 of illustrative steps for controlling a free-piston engine in accordance with some embodiments of the present disclosure. It will be understood that the foregoing steps may be implemented with any suitable free-piston engine and/or free-piston engine systems or components thereof as described above with respect to FIGS. 2-12, or any other suitable free-piston engine or free-piston engine systems.

Step 1602 includes receiving engine operating characteristics from sensors. In some embodiments, engine operating characteristics may be received by processing equipment 1512 or any processing circuitry thereof from sensors 1530 via sensor interface 1216 as described above with respect to FIG. 15. In some embodiments, engine operating characteristics may include any of the operating characteristics described above or any suitable combination thereof. For example, processing equipment 1512 may receive the compression ratio, the pressure and temperature of the combustion section, and the mass of the piston assembly. In some embodiments, processing equipment 1512 may receive engine operating characteristics that provide information regarding the kinetic energy of the piston assembly from sensors 1530 via sensor interface 1516 as described above. In some embodiments, processing equipment 1512 may receive engine operating characteristics that provide information regarding the amount of energy that can be stored in the driver section from sensors 1530 via sensor interface 1516 as described above Step 1604 includes generating at least one control signal based on the operating characteristics received in step 1602. In some embodiments, processing equipment 1512 or any processing circuitry thereof may generate one or more control signals based on the operating characteristics received in step 1602. For example, processing equipment 1512 may generate control signals usable to adjust any of the aspects or properties of piston engine 1540 discussed above with respect to FIG. 15 required in order to store the requisite amount of energy in the driver section to perform a subsequent stroke of a piston cycle In some embodiments, processing equipment 1512 or any processing circuitry thereof may generate control signals to cause the driver section of piston engine 1540 to store a sufficient amount of energy during an expansion stroke of the piston cycle for the purpose of avoiding net electrical energy input over the subsequent stroke of the piston cycle. In some embodiments, processing equipment 1512 or any processing circuitry thereof may generate control signals that necessarily cause the driver section of piston engine 1540 to store a sufficient amount of energy during an expansion stroke of the piston cycle to perform the subsequent stroke of the piston cycle without net electrical energy input over the subsequent stroke. In some embodiments, the subsequent stroke may comprise a compression stroke. In some embodiments, the subsequent stroke may comprise an exhaust stroke.

In some embodiments, processing equipment may receive any of the operating characteristics described above and generate control signals in steps 1602 and 1604 in a manner that takes into account changes in operating characteristics over time. For example, processing equipment may receive the position, speed, and/or acceleration of the piston assembly over time and generate control signals to adjust the operating characteristics accordingly. In some embodiments, processing equipment may receive engine operating characteristics that provide information regarding the kinetic energy of the piston assembly from sensors 1530 via sensor interface 1516 as described above on a periodic basis and generate updated control signals accordingly. In some embodiments, processing equipment may receive engine operating characteristics that provide information regarding the amount of energy that can be stored in the driver section from sensors 1530 via sensor interface 1516 as described above on a periodic basis and determine updated control signals accordingly. In some embodiments, relevant operating characteristics may be received and control signals may be generated at any suitable frequency such that the changes in operating characteristics over time can be taken into account before the subsequent stroke occurs. For example, the receipt and analysis of operating characteristics may occur at frequencies allowing for evaluation of the operating characteristics multiple times per stroke (e.g. 100 Hz to 100 khz).

In some embodiments, processing equipment may take into account losses expected to occur in the energy storage and conversion process in generating any of the control signals in step 1604. For example, processing equipment may determine the amount of energy required for a subsequent stroke or the amount to be stored in the driver section based on known or predictable frictional losses, heat losses, or any other suitable losses associated with the energy storage and/or conversion. In some embodiments, processing equipment may allow for unexpected losses in generating any of the control signals in step 1604. For example, the processor may add a buffer amount of energy to account for unexpected losses during performance of the subsequent stroke when determining the amount of energy required for the subsequent stroke. As another example, the processor may add a buffer amount of energy to account for unexpected losses during storage of energy in the driver section during the expansion stroke when determining the amount of energy to be stored in the driver section during the expansion stroke.

Step 1606 includes causing an amount of energy to be stored in the driver section during the expansion stroke based on one or more of the control signals generated in step 1604. In some embodiments, processing equipment 1512 or any processing circuitry thereof may communicate control signals to any of the auxiliary systems 1520 via control interface 1518 in order to adjust the aspects or properties of piston engine 1540 so that the requisite amount of energy is stored in the driver section during the expansion stroke. For example, control signals may act to adjust the pressure of the driver section by instructing gas driver control system 1526 to add or remove gas to the driver section via an inlet gas port in order to store an amount of energy in the driver section during the expansion stroke. In some embodiments, control signals may act to adjust the dead volume of the cylinder by adjusting the settings of any of auxiliary systems 1520. In some embodiments, control signals may act to adjust any suitable properties of a gas spring using any of the mechanisms described above with respect to FIGS. 8-12. In some embodiments, as described above with respect to steps 1504 and 1506, processing equipment may generate control signals and communicate with the piston engine and/or auxiliary systems thereof with any suitable frequency such that the changes in operating characteristics over time can be taken into account before the subsequent stroke occurs. For example, processing equipment may generate control signals and communicate with the piston multiple times per stroke to ensure response to changing operating characteristics.

Step 1608 includes causing an amount of kinetic energy of the piston assembly to be converted into electrical energy based on one or more of the control signals generated in step 1604. In some embodiments, processing equipment 1512 or any processing circuitry thereof may determine an amount of kinetic energy of the at least one free-piston assembly to convert into electrical energy and may cause at least one LEM to convert an amount of kinetic energy of the free-piston assembly into electrical energy based thereon. In some embodiments, processing equipment 1512 may cause at least one LEM to directly convert an amount of kinetic energy of the at least one free-piston assembly into electrical energy during an expansion stroke of the piston cycle. In some embodiments, one or more processors of processing equipment 1512 may cause at least one LEM to convert kinetic energy of the at least one free-piston assembly into electrical energy during the subsequent stroke of the piston cycle. For example, processing equipment 1512 may cause at least one LEM to convert kinetic energy of the at least one free-piston assembly into electrical energy during any of the expansion stroke, the compression stroke, the exhaust stroke, the intake stroke, or any combination thereof. For example, one or more processors of processing equipment 1512 may cause at least one LEM to convert the same amount of kinetic energy of the at least one free-piston assembly into electrical energy during both the expansion stroke and the subsequent stroke of the piston cycle. In some embodiments, the amount of kinetic energy converted into electrical energy by the at least one LEM may be determined such that it accounts for at least a predetermined minimum percentage of a total output power of the free-piston engine. In some embodiments, the amount of kinetic energy converted into electrical energy by the at least one LEM may be determined in order to maximize at least one of engine efficiency, engine power output, and engine emissions. In some embodiments, the amount of kinetic energy converted into electrical energy by the at least one LEM may be based on a difference between the first amount of energy stored in step 1606 and the amount of energy required for the subsequent stroke. For example, if the amount of energy stored in step 1606 exceeds the amount of energy required for the subsequent stroke, the amount of kinetic energy converted into electrical energy by the at least one LEM may be equal to or otherwise based on the excess stored amount.

Step 1610 includes causing the subsequent stroke following the expansion stroke to be performed without net electrical energy input. In some embodiments, the energy stored in the driver section during the expansion stroke may provide at least some of the energy required for the subsequent stroke. In some embodiments, the energy stored in the driver section during the expansion stroke may provide all of the energy required for the subsequent stroke, such that no electrical energy input is needed for the subsequent stroke. In some embodiments, some electrical energy may be input during the subsequent stroke, but not so much as to amount to net electrical input over the subsequent stroke. For example, as described above with respect to FIG. 14, energy may be input in order to increase the speed of the piston assembly or otherwise ensure that the piston assembly reaches a desired position. In some embodiments, the subsequent stroke may be a compression stroke. In some embodiments, the subsequent stroke may be an exhaust stroke.

As shown in FIG. 16, steps 1602 through 1610 may be repeated for each piston cycle. In some embodiments, any or all of steps 1602 through 1610 may be repeated for each piston cycle over a consecutive number of piston cycles such that the engine operates continuously across the consecutive number of piston cycles without net electrical energy input. For example, after receiving electrical input from an LEM for start-up of the engine, steps 1602 through 1610 may be repeated for each piston cycle over a consecutive number of piston cycles to store enough energy in the driver section during each expansion stroke so as to avoid any further input from the LEM during the consecutive number of piston cycles. In some embodiments, steps 1602 through 1610 may be repeated such that operating conditions are continually being checked and the various amounts of energy to be stored and/or converted are continually updated to ensure that no external electrical energy input is needed.

It will be understood that while the processing equipment is able to determine values that correspond to amounts of energy to be stored in the driver section, the amounts that are actually stored in some cases may not be exactly as determined due to unforeseen engine losses, tolerances, environmental factors, or any other suitable condition. It is expected, however, that the actual stored amounts will be sufficiently close to the calculated values so that operation of the engine will only be minimally affected, if at all. As described above, in some embodiments, the processing equipment may account for these unknown losses or other suitable conditions by including buffers in the various amounts of energy to be stored.

For ease of reference, the figures may show multiple components labeled with identical reference numerals. It will be understood that this does not necessarily indicate that the multiple components identically labeled are identical to one another. For example, the pistons labeled 125 may have different sizes, geometries, materials, any other suitable characteristic, or any combination thereof.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A free-piston combustion engine system, comprising:
a cylinder comprising a combustion section;
at least one tree-piston assembly in contact with the combustion section;
at least one gas spring in contact with the at least one free-piston assembly, wherein the at least one gas spring is configured to store energy from the at least one free-piston assembly during an expansion stroke of a piston cycle;
at least one linear electromagnetic machine for directly converting between kinetic energy of the at least one free-piston assembly and electrical energy; and
processing circuitry configured for:
  causing the at least one gas spring to store at least a sufficient amount of energy from the at least one free-piston assembly during the expansion stroke to perform a subsequent stroke of the piston cycle thereby avoiding net electrical energy input over the subsequent stroke of the piston cycle by controlling at least a position of the at least one free-piston assembly, and
  causing the linear electromagnetic machine to convert at least some of the energy stored in the at least one gas spring into electrical energy during the subsequent stroke of the piston cycle.

2. The free-piston combustion engine system of claim 1, wherein causing the at least one gas spring to store at least the sufficient amount of energy from the at least one free-piston assembly during the expansion stroke to perform the subsequent stroke of the piston cycle comprises controlling a dead volume of the at least one gas spring.

3. The free-piston combustion engine system of claim 2, wherein controlling the dead volume of the at least one gas spring comprises controlling a bottom-dead-center position of the at least one free-piston assembly.

4. The free-piston combustion engine system of claim 1, wherein causing the at least one gas spring to store at least the sufficient amount of energy from the at least one free-piston assembly during the expansion stroke to perform the subsequent stroke of the piston cycle comprises controlling a geometry of the at least one gas spring.

5. The free-piston engine system of claim 1, wherein the expansion stroke is one of a power stroke and an intake stroke.

6. The free-piston engine system of claim 1, wherein the subsequent stroke is one of a compression stroke and an exhaust stroke.

7. The free-piston engine system of claim 1, wherein, during the subsequent stroke of the piston cycle, the linear electromagnetic machine is configured to convert approximately a difference between an amount of energy stored in the gas spring during the expansion stroke and the sufficient amount of energy into electrical energy.

8. The free-piston engine system of claim 1, wherein the linear electromagnetic machine is configured to convert approximately a same amount of kinetic energy into electrical energy during the expansion stroke as during the subsequent stroke.

9. The free-piston engine system of claim 1, wherein the processing circuitry is configured to control conversion between kinetic energy of the at least one free-piston assembly and electrical energy by the linear electromagnetic machine in order to at least one of maximize engine efficiency and maximize engine power output.

10. The free-piston engine system of claim 1, wherein the processing circuitry is configured to control conversion between kinetic energy of the at least one free-piston assembly and electrical energy by the linear electromagnetic machine during the expansion stroke such that a desired amount of energy is converted to electrical energy by the linear electromagnetic machine during the subsequent stroke.

11. The free-piston engine system of claim 1, wherein the processing circuitry is configured to control conversion between kinetic energy of the at least one free-piston assembly and electrical energy by the linear electromagnetic machine during the expansion stroke and the subsequent stroke such that an approximately same amount of energy is converted to electrical energy during the expansion stroke as during the subsequent stroke.

12. The free-piston engine system of claim 1, wherein the at least one gas spring comprises at least one of a passive inlet gas port and a controllable inlet gas port.

13. The free-piston engine system of claim 1, wherein the processing circuitry is configured to control the at least one gas spring in order to maximize at least one of engine efficiency and engine power.

14. The free-piston engine system of claim 1, wherein the processing circuitry is configured to control at least one of the free-piston assembly, the at least one gas spring, and the linear electromagnetic machine based on at least one of position of the piston assembly, velocity of the piston assembly, acceleration of the piston assembly, temperature of the piston assembly, pressure of the combustion section, temperature of the combustion section, potential energy of the combustion section, chemical energy in the combustion section, indicated work of the combustion section, indicated efficiency of the combustion section, fuel flow rate of the combustion section, air flow rate of the combustion section, pressure in the at least one gas spring, potential energy of the at least one gas spring, temperature of gas in the at least one gas spring, indicated work of the at least one gas spring, indicated efficiency of the at least one gas spring, make-up air flow rate of the at least one gas spring, temperature of the linear electromagnetic machine, electric output, electrical efficiency, engine efficiency, engine power, previous cycle performance, environmental temperature, environmental pressure, emissions characteristics, and any combination thereof.

15. The free-piston engine system of claim 1, wherein the processing circuitry is configured to cause the gas spring to store energy from the at least one free-piston assembly during the expansion stroke by controlling at least one of a force, pressure, and volume associated with the gas spring.

16. A method of controlling a free-piston combustion engine comprising at least one free-piston assembly in contact with a respective at least one gas spring, and at least one linear electromagnetic machine for directly converting between kinetic energy of the at least one free-piston assembly and electrical energy, the method comprising:

receiving at least one operating characteristic of the free-piston combustion engine, wherein the operating characteristic comprises a position of the at least one free-piston assembly;

causing the at least one gas spring to store at least a sufficient amount of energy from the at least one free-piston assembly during an expansion stroke of a piston cycle to perform a subsequent stroke of the piston cycle by controlling a position of the free-piston assembly;

causing, using the processing circuitry, the subsequent stroke of the piston cycle to be performed without net electrical energy input to the engine; and causing, using the processing circuitry, the linear electromagnetic machine to convert at least some of the energy of the free-piston assembly into electrical energy during the subsequent stroke.

17. The method of claim 16, wherein causing the at least one gas spring to store at least the sufficient amount of energy from the at least one free-piston assembly during the expansion stroke to perform the subsequent stroke of the piston cycle comprises controlling a dead volume of the at least one gas spring.

18. The method of claim 17, wherein controlling the dead volume of the at least one gas spring comprises controlling a bottom-dead-center position of the at least one free-piston assembly.

19. The method of claim 16, wherein causing the at least one gas spring to store at least the sufficient amount of energy from the at least one free-piston assembly during the expansion stroke to perform the subsequent stroke of the piston cycle comprises controlling a geometry of the at least one gas spring.

20. The method of claim 16, wherein the at least one operating characteristic is selected from the group consisting of position of the piston assembly, velocity of the piston assembly, acceleration of the piston assembly, temperature of the piston assembly, pressure of the combustion section, temperature of the combustion section, potential energy of the combustion section, chemical energy in the combustion section, indicated work of the combustion section, indicated efficiency of the combustion section, fuel flow rate of the combustion section, air flow rate of the combustion section, pressure in the at least one gas spring, potential energy of the at least one gas spring, temperature of gas in the at least one gas spring, indicated work of the at least one gas spring, indicated efficiency of the at least one gas spring, make-up air flow rate of the at least one gas spring, temperature of the linear electromagnetic machine, electric output, electrical efficiency, engine efficiency, engine power, previous cycle performance, environmental temperature, environmental pressure, and emissions characteristics.

21. A system for controlling a free-piston combustion engine comprising at least one free-piston assembly in contact with a respective at least one gas spring, and at least one linear electromagnetic machine for directly converting kinetic energy of the at least one free-piston assembly into electrical energy, the system comprising:

at least one sensor coupled to the free-piston combustion engine for outputting a respective at least one sensor signal;

at least one control mechanism for adjusting a respective at least one operating characteristic of the free-piston combustion engine based on a respective at least one control signal, wherein the operating characteristic comprises a position of the at least one free-piston assembly; and processing circuitry that processes that at least one sensor signal to generate the at least one control signal, the at least one control signal used by the control mechanism to:

store at least sufficient amount of energy from the at least one free-piston assembly during the expansion stroke in the at least one gas spring to perform a subsequent stroke of the piston cycle without net electrical energy input over the subsequent stroke of the piston cycle, and cause the linear electromagnetic machine to convert at least some of the energy of the free-piston assembly into electrical energy during the subsequent stroke.

22. The system of claim 21, wherein in order to store at least a sufficient amount of energy from the at least one free-piston assembly during the expansion stroke in the at least one gas spring to perform a subsequent stroke of the piston cycle, the control signal is used by the control mechanism to control a dead volume of the at least one gas spring.

23. The system of claim 22, wherein to control the dead volume of the at least one gas spring comprises controlling a bottom-dead-center position of the at least one free-piston assembly.

24. The system of claim 21, wherein the at least one sensor is selected from the group consisting of a position sensor, a velocity sensor, an accelerometer, a temperature sensor, a pressure sensor, a flow rate sensor, a current sensor, a voltage sensor, a resistance sensor, an impedance sensor, a vibration sensor, a motion sensor, a force sensor, and an emissions sensor.

* * * * *

UNITED STATES PATENT AND TRADEMARK OFFICE
CERTIFICATE OF CORRECTION

PATENT NO. : 10,190,490 B2
APPLICATION NO. : 15/645995
DATED : January 29, 2019
INVENTOR(S) : Gadda et al.

Page 1 of 1

It is certified that error appears in the above-identified patent and that said Letters Patent is hereby corrected as shown below:

In the Claims

At Column 27, Claim 1, Line 15, change "tree-piston" to --free-piston--.

Signed and Sealed this
Sixteenth Day of July, 2019

Andrei Iancu
*Director of the United States Patent and Trademark Office*